(12) United States Patent
Meng et al.

(10) Patent No.: US 11,262,492 B2
(45) Date of Patent: Mar. 1, 2022

(54) BACKLIGHT MODULE AND DISPLAY DEVICE

(71) Applicant: BOE Technology Group Co., Ltd., Beijing (CN)

(72) Inventors: Xiandong Meng, Beijing (CN); Wei Wang, Beijing (CN); Xiaochuan Chen, Beijing (CN); Jifeng Tan, Beijing (CN); Xianqin Meng, Beijing (CN); Jian Gao, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 607 days.

(21) Appl. No.: 16/322,599

(22) PCT Filed: May 28, 2018

(86) PCT No.: PCT/CN2018/088733
§ 371 (c)(1),
(2) Date: Feb. 1, 2019

(87) PCT Pub. No.: WO2019/062174
PCT Pub. Date: Apr. 4, 2019

(65) Prior Publication Data
US 2021/0364688 A1 Nov. 25, 2021

(30) Foreign Application Priority Data

Sep. 28, 2017 (CN) .......................... 201710900547.0

(51) Int. Cl.
*F21V 8/00* (2006.01)
*G02B 5/00* (2006.01)

(52) U.S. Cl.
CPC ........... *G02B 6/0023* (2013.01); *G02B 5/003* (2013.01); *G02B 6/005* (2013.01); *G02B 6/0073* (2013.01)

(58) Field of Classification Search
None
See application file for complete search history.

(56) References Cited

U.S. PATENT DOCUMENTS

| 5,745,266 A * | 4/1998 | Smith | ...................... B60Q 1/30 |
| | | | 359/34 |
| 2005/0254258 A1 | 11/2005 | Lee | |

(Continued)

FOREIGN PATENT DOCUMENTS

| CN | 105739008 A | 7/2016 |
| CN | 106338860 A | 1/2017 |

(Continued)

OTHER PUBLICATIONS

Extended European search report of counterpart EP application No. 18839799.6 dated May 11, 2021.

(Continued)

*Primary Examiner* — Elmito Breval
(74) *Attorney, Agent, or Firm* — Fay Sharpe LLP

(57) ABSTRACT

A backlight module and display device are provided. The backlight module includes: a light source module including a transparent block, a light source and a first grating group, and a light emergent module including a light guide plate and a second grating group. The light source emits initial lights to the first grating group which diffracts initial into first diffracted lights, and transmits first diffracted lights in light guide plate to second grating group; the second grating group diffracts the first diffracted lights into second diffracted lights, and enables the second diffracted lights to be emergent from backlight module. When an included angle between initial lights and side surface of light guide plate is greater than 0°, an angle between second diffracted lights and side surface is smaller than an angle between initial (Continued)

lights and side surface, thereby improving collimation degree of lights emergent from backlight module.

20 Claims, 16 Drawing Sheets

(56) References Cited

U.S. PATENT DOCUMENTS

| | | | | |
|---|---|---|---|---|
| 2012/0163027 | A1* | 6/2012 | Vissenberg | G02B 6/005 |
| | | | | 362/612 |
| 2015/0185393 | A1* | 7/2015 | Bang | G02B 6/0023 |
| | | | | 362/608 |
| 2015/0277117 | A1 | 10/2015 | Yamada et al. | |
| 2016/0187556 | A1 | 6/2016 | Bang et al. | |
| 2017/0010400 | A1 | 1/2017 | Bang et al. | |
| 2017/0299799 | A1 | 10/2017 | Fattal | |
| 2019/0086599 | A1 | 3/2019 | Meng et al. | |
| 2019/0146221 | A1* | 5/2019 | Oku | G02B 6/0026 |
| | | | | 359/13 |

FOREIGN PATENT DOCUMENTS

| | | |
|---|---|---|
| CN | 107065307 A | 8/2017 |
| CN | 107167925 A | 9/2017 |
| CN | 107479128 A | 12/2017 |
| WO | WO2016111706 A1 | 7/2016 |

OTHER PUBLICATIONS

International search report of PCT application No. PCT/CN2018/088733 dated Sep. 6, 2018.

* cited by examiner

BACKLIGHT MODULE AND DISPLAY DEVICE

CROSS-REFERENCE TO RELATED APPLICATION

This application is a 371 of PCT Patent Application Serial No. PCT/CN2018/088733, filed on May 28, 2018, which claims priority to Chinese Patent Application No. 201710900547.0, filed on Sep. 28, 2017, which is incorporated herein by reference in its entirety.

TECHNICAL FIELD

The present disclosure relates to a backlight module and a display device.

BACKGROUND

With the development of society, various display devices such as mobile phones, computers and televisions are more and more inseparable from people's lives. However, the display devices may also cause leakage of personal information while providing a lot of convenience for people.

In the related art, a display device generally comprises a backlight module and a display panel. The backlight module comprises: a light source and a light guide plate. The light source is disposed on a light incident side of the light guide plate. The light guide plate is disposed on a light incident side of the display panel. The light source can emit lights to the surroundings. The lights incident on the light guide plate can be uniformly incident on the display panel under the action of the light guide plate, thereby lighting the display panel, and further causing the display panel to display an image.

SUMMARY

The present disclosure relates to a backlight module and a display device.

In a first aspect, there is provided a backlight module, comprising: a light source module and a light emergent module. The light source module comprises a transparent block, a light source and a first grating group; the light emergent module comprises: a light guide plate and a second grating group. The first grating group is attached to a surface of the transparent block and is opposite to the light source; the light guide plate is provided with a side surface perpendicular to the backlight surface, and a light emergent surface and a backlight surface that are opposite; the light source module is attached to the side surface of the light guide plate; and the second grating group is attached to at least one of the backlight surface and the light emergent surface. The light source is configured to emit initial lights to the first grating group; the first grating group is configured to diffract the initial lights into first diffracted lights, and transmit the first diffracted lights in the light guide plate to the second grating group; the second grating group is configured to diffract the first diffracted lights into second diffracted lights, enable the second diffracted lights to be emergent from the backlight module. The second grating group is capable of diffracting first target diffracted lights into second target diffracted lights, the first target diffracted lights being acquired by the first grating group which diffracts the initial lights having an angle with side surface greater than zero, and an angle between the second target diffracted lights and the side surface is smaller than the angle between the initial lights and the side surface.

Optionally, the transparent block is attached to the side surface of the light guide plate, the surface to which the light source is attached is parallel to the backlight surface, the surface to which the first grating group is attached is parallel to the light emergent surface, and the first grating group includes at least one reflection grating.

Optionally, the first grating group is attached to the side surface of the light guide plate, and the first grating group includes at least one transmission grating.

Optionally, propagation directions of the plurality of first diffracted lights generated by diffracting of the first grating group are parallel to the same plane.

Optionally, parameters of any two gratings in the first grating group are different, and the parameters of any two gratings in the second grating group are different.

Optionally, a diffraction energy level of the first diffracted lights is 1 or −1; or, the first diffracted lights comprise two types of diffracted lights with the diffraction energy levels of 1 and −1 respectively; and a diffraction energy level of the second diffracted lights is 1 or −1.

Optionally, the first grating group comprises a plurality of first gratings, the second grating group comprises a plurality of second gratings, and the second gratings are Bragg gratings, a plurality of included angles are formed between the plurality of first diffracted lights generated by the diffracting of the first grating group and the side surface, and angle values of the plurality of included angles belong to a set of angle values of Bragg angles of the plurality of second gratings.

Optionally, second grating is attached to the backlight surface, and the second grating is a reflection Bragg grating.

Optionally, the second grating is attached to the light emergent surface, and the second grating is a transmission Bragg grating.

Optionally, a part of the second gratings are attached to the backlight surface, and the other part of the second gratings are attached to the light emergent surface. The second gratings attached to the backlight surface are reflection Bragg gratings, the second gratings attached to the light emergent surface are transmission Bragg gratings, and orthogonal projection areas of any two second gratings in the second grating group on the light emergent surface do not overlap.

Optionally, the second gratings attached to the backlight surface and the second gratings attached to the light emergent surface are at an interval one by one.

Optionally, the backlight module further comprises: a semi-transparent film group. The semi-transparent film group is on a side of the light emergent surface of the light guide plate, and is configured to control the second diffracted lights from the second grating group to be incident to the semi-transparent film group. The semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights.

Optionally, the plurality of semi-transparent films comprise first semi-transparent films and second semi-transparent films. The second diffracted lights incident to the first semi-transparent films are more than the second diffracted lights incident to the second semi-transparent films, and a light transmittance of the first semi-transparent films is smaller than a light transmittance of the second semi-transparent films.

Optionally, the plurality of semi-transparent films are arranged in array, and the plurality of semi-transparent films have same shapes and same areas.

Optionally, a side of the first grating group away from the transparent block is provided with a flat layer, and the first grating group is attached to the side surface of the light guide plate through the flat layer.

Optionally, the backlight module comprises: at least one light source module and at least one light emergent module, and the at least one light source module and the at least one light emergent module are disposed at an interval one by one.

Optionally, on a side of the light emergent surface of the light guide plate, an area in the backlight module other than an area where the backlight module is provided is wrapped by a light absorbing layer.

Optionally, when an included angle between the initial lights and the side surface is equal to 0 degree, an included angle between the second diffracted lights and the side surface is equal to 0 degree.

Optionally, the second grating group diffracts first auxiliary diffracted lights into second auxiliary diffracted lights, the first auxiliary diffracted lights being acquired by the first grating group which diffracts the initial lights having an angle with side surface equal to zero, and an angle between the second target diffracted lights and the side surface is equal to zero.

Optionally, a length of each of the second gratings is equal to a total length of the first grating group.

Optionally, a structure of the backlight module satisfies one of the following: the transparent block is attached to the side surface of the light guide plate, the surface to which the light source is attached is parallel to the backlight surface, the surface to which the first grating group is attached is parallel to the light emergent surface, and the first grating group includes at least one reflection grating, the second grating group comprises a plurality of second gratings, the second grating is attached to the backlight surface, and the second grating is a reflection Bragg grating, wherein the backlight module further comprises: a semi-transparent film group, the semi-transparent film group is on a side of the light emergent surface of the light guide plate, and is configured to control the second diffracted lights from the second grating group to be incident to the semi-transparent film group; the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights, a side of the first grating group away from the transparent block is provided with a flat layer, and on a side of the light emergent surface of the light guide plate, an area in the backlight module other than an area where the backlight module is provided: the transparent block is attached to the side surface of the light guide plate, the surface to which the light source is attached is parallel to the backlight surface, the surface to which the first grating group is attached is parallel to the light emergent surface, and the first grating group includes at least one reflection grating, the second grating group comprises a plurality of second gratings, the second grating is attached to the light emergent surface, and the second grating is a transmission Bragg grating; wherein the backlight module further comprises: a semi-transparent film group, the semi-transparent film group is on a side of the light emergent surface of the light guide plate, and is configured to control the second diffracted lights from the second grating group to be incident to the semi-transparent film group; the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights, a side of the first grating group away from the transparent block is provided with a flat layer, and on a side of the light emergent surface of the light guide plate, an area in the backlight module other than an area where the backlight module is provided: the transparent block is attached to the side surface of the light guide plate, the surface to which the light source is attached is parallel to the backlight surface, the surface to which the first grating group is attached is parallel to the light emergent surface, and the first grating group includes at least one reflection grating, the second grating group comprises a plurality of second gratings; a part of the second gratings are attached to the backlight surface, and the other part of the second gratings are attached to the light emergent surface; the second gratings attached to the backlight surface are reflection Bragg gratings, the second gratings attached to the light emergent surface are transmission Bragg gratings, and orthogonal projection areas of any two second gratings in the second grating group on the light emergent surface do not overlap: wherein the backlight module further comprises: a semi-transparent film group, the semi-transparent film group is on a side of the light emergent surface of the light guide plate, and is configured to control the second diffracted lights from the second grating group to be incident to the semi-transparent film group: the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights, a side of the first grating group away from the transparent block is provided with a flat layer, and on a side of the light emergent surface of the light guide plate, an area in the backlight module other than an area where the backlight module is provided: the first grating group is attached to the side surface of the light guide plate, and the first grating group includes at least one transmission grating, the second grating group comprises a plurality of second gratings, the second grating is attached to the backlight surface, and the second grating is a reflection Bragg grating; configured to control the second diffracted lights from the second grating group to be incident to the semi-transparent film group: the semi-transparent film in the semi-transparent film group is obliquely disposed on the light emergent surface, and semi-transparent film is configured to reflect a part of the incident second diffracted lights to other semi-transparent films, and transmit the other part of the incident second diffracted lights; a side of the first grating group away from the transparent block is provided with a flat layer: and on a side of the light emergent surface of the light guide plate, an area in the backlight module other than an area where the backlight module is provided is wrapped by a light absorbing layer; the first grating group is attached to the side surface of the light guide plate, and the first grating group includes at least one transmission grating, the second grating group comprises a plurality of second gratings, the second gratings is attached to the backlight surface, and each of the second gratings is a reflection Bragg grating; configured to control the second diffracted lights from the second grating group to be incident to the semi-transparent film group: the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights; a side of the first grating group away from the transparent block is provided with a flat layer: and on a side of the light emergent surface of the light guide plate, an area in the backlight module other than an area where the backlight module is provided is wrapped by a light absorbing layer, and the first grating group is attached to the side surface of the light guide plate, and the first grating group includes at least one transmission grating; the second grating group comprises a plurality of second gratings, a part of the second gratings are attached to the backlight surface, and the other part of the second gratings are attached to the light emergent surface; the second gratings attached to the backlight surface are reflection Bragg gratings, the second gratings attached to the light emergent surface are transmission Bragg gratings, and orthogonal projection areas of any two second gratings in the second grating group on the light emergent surface do not overlap; the backlight module further comprises: a semi-transparent film group, the semi-transparent film group is on a side of the light emergent surface of the light guide plate, and is configured to control the second diffracted lights from the second grating group to be incident to the semi-transparent film group; the semi-transparent film in the semi-transparent film group is obliquely disposed on the light emergent surface: and semi-transparent film is configured to reflect a part of the incident second diffracted lights to other semi-transparent films, and transmit the other part of the incident second diffracted lights; a side of the first grating group away from the transparent block is provided with a flat layer; on a side of the light emergent surface of the light guide plate, an area in the backlight module other than an area where the backlight module is provided is wrapped by a light absorbing layer.

In a second aspect, there is provided a display device, comprising a display panel and the backlight module in the first aspect. The display panel is located on a side of the backlight module where the light emergent surface of the light guide plate is located.

DETAILED DESCRIPTION

In order to clarify the principles and advantages of the present disclosure, the embodiments of the present disclosure will be further described in detail below in conjunction with the accompanying drawings.

Figure 1:
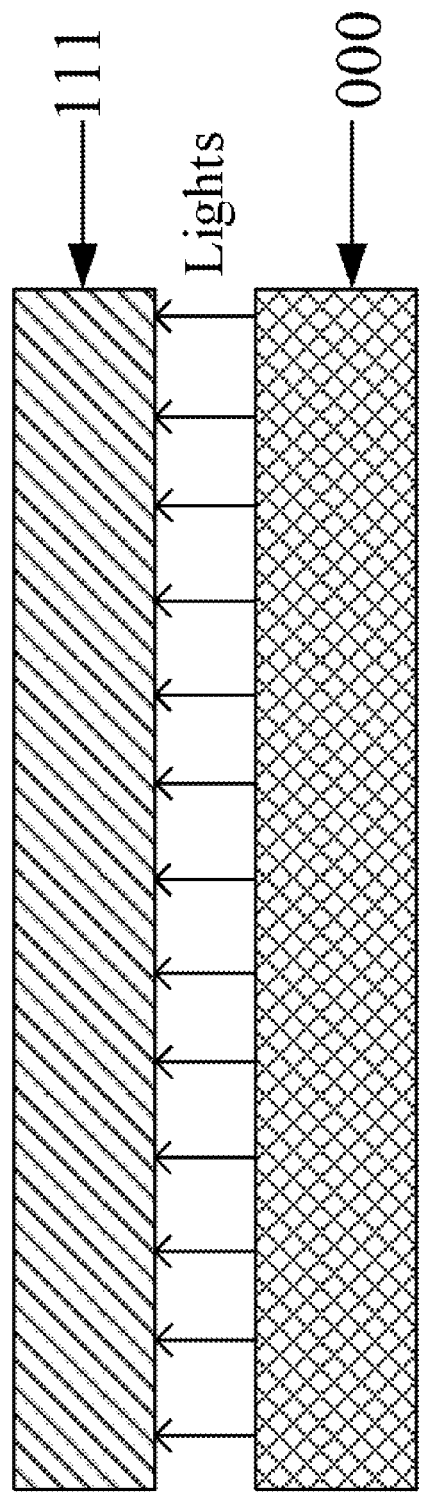
FIG. 1 is a schematic diagram of an application scenario of a backlight module according to an embodiment of the present disclosure.

FIG. 1 is a schematic diagram of an application scenario of a backlight module according to an embodiment of the present disclosure. As shown in FIG. 1, a backlight module 000 is generally disposed on a light incident side of a display panel 111. The backlight module 000 can emit lights to the display panel 111, so as to provide backlights for the display panel 111, and further the display panel 111 can display an image according to the backlights incident on the display panel 111. Exemplarily, the display panel 111 is a liquid crystal display panel.

Figure 2:
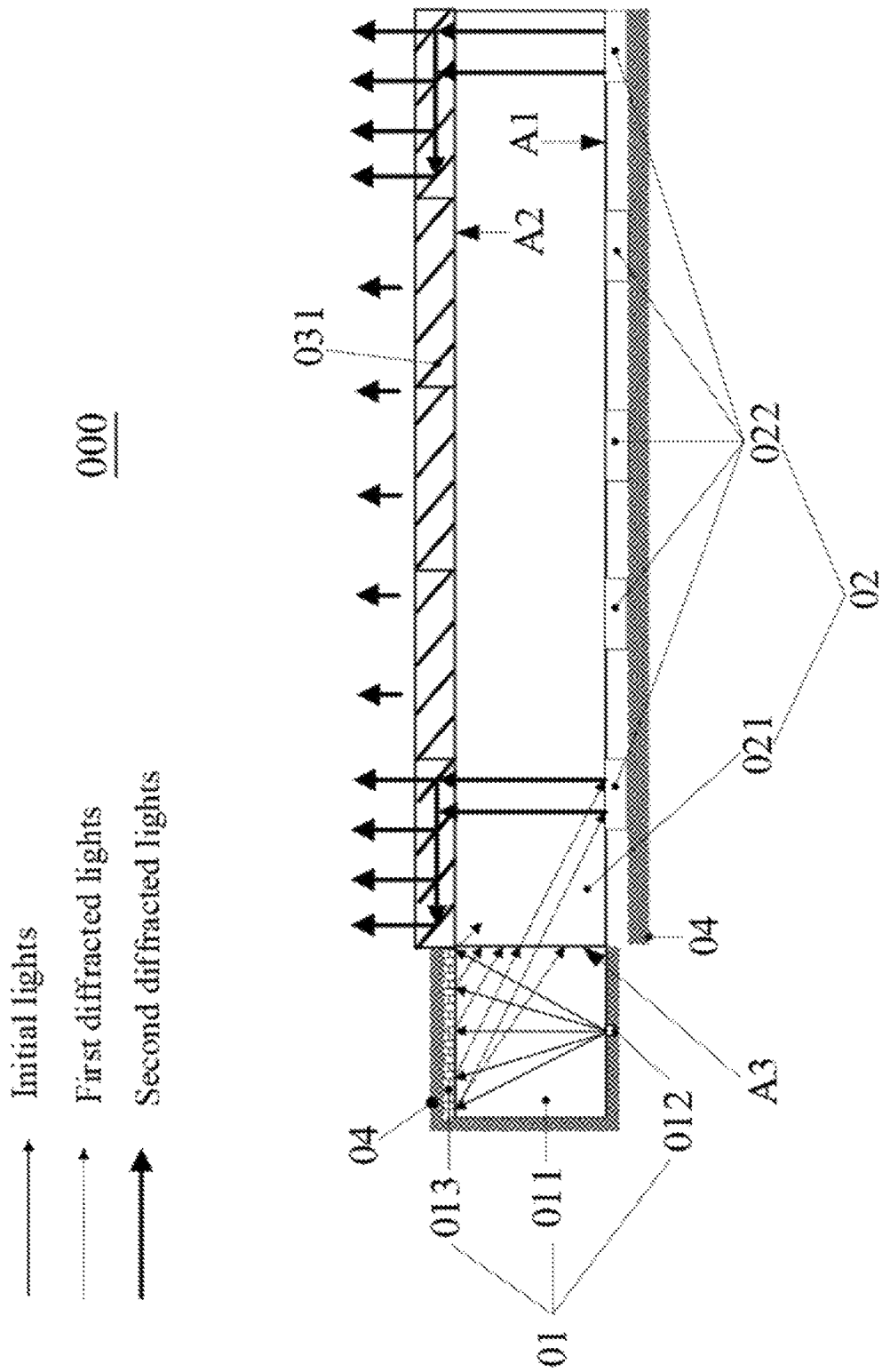
FIG. 2 is a schematic diagram of a structure of a backlight module according to an embodiment of the present disclosure.

FIG. 2 is a schematic diagram of a structure of a backlight module according to an embodiment of the present disclosure. As shown in FIG. 2, the backlight module 000 may include: a light source module 01 and a light emergent module 02, wherein the light source module 01 may include a transparent block 011, a light source 012 and a first grating group 013; and the light emergent module 02 may include: a light guide plate 021 and a second grating group 022.

The first grating group 013 is attached to the surface of the transparent block 011 and is disposed opposite to the light source 012. The light guide plate 021 is provided with a light emergent surface A2 and a backlight surface A1 that are oppositely disposed, and a side surface A3 perpendicular to the backlight surface A1. Optionally, the light emergent surface can be parallel to the light. The light source module 01 is attached to the side surface A3 of the light guide plate 021; and the second grating group 022 is attached to at least one of the backlight surface A1 and the light emergent surface A2.

The light source 012 is capable of emitting initial lights to the first grating group 013; the first grating group 013 is capable of diffracting the initial lights into first diffracted lights, and transmitting the first diffracted lights in the light guide plate 021 to the second grating group 022; the second grating group 022 is capable of diffracting the first diffracted lights into second diffracted lights, and enabling the second diffracted lights to be emergent from the backlight module 000.

Herein, the second grating group 022 is capable of diffracting first target diffracted lights into second target diffracted lights, the first target diffracted lights are acquired by the first grating group 013 which diffracts the initial lights having an angle with side surface A3 greater than zero, and an angle between the second target diffracted lights and the side surface A3 is smaller than the angle between the initial lights and the side surface A3.

In summary, in the backlight module provided by an embodiment of the present disclosure, the light source and the first grating group are oppositely disposed, and the first grating group can emit the first diffracted lights to the second grating group according to the initial lights emitted by the light source, so that the second grating group emits the second diffracted lights to the outside of the backlight module according to the first diffracted lights. When the included angle between the initial lights and the side surface is greater than zero degree, the included angle between the second diffracted lights and the side surface of the light guide plate is smaller than the included angle between the initial lights and the side surface of the light guide plate. That is, the collimation degree of the second diffracted lights is higher than that of the initial lights emitted by the light source, thereby improving the collimation degree of the lights emergent from the backlight module.

Optionally, the first grating group 013 may enable the first diffracted lights to be totally reflected in the light guide plate 021 and transmitted to the second grating group 022.

In the embodiments of the present disclosure, when the included angle between the initial lights and the side surface is greater than zero degree (the initial lights here can be referred to as target initial lights), the collimation degree of the initial lights is lower. After the first grating group diffracts the target initial lights into the first target diffracted lights, the second grating group diffracts the first target diffracted lights into second target diffracted lights having a higher collimation degree.

In addition, the second grating group 022 diffracts first auxiliary diffracted lights into second auxiliary diffracted lights, the first auxiliary diffracted lights are acquired by the first grating group 013 which diffracts the auxiliary initial lights having an angle with side surface A3 equal to zero, and an included angle between the second target diffracted lights and the side surface A3 is equal to zero. That is, when the included angle between the initial lights and the side surface of the light guide plate is zero degree, the included angle between the second diffracted lights and the side surface of the light guide plate is also zero degree.

It should be noted that the light guide plate is generally a rectangular parallelepiped. There are two surfaces, which are oppositely disposed and have larger areas, among the six surfaces of the light guide plate, and such two surfaces are referred to as a light emergent surface and a backlight surface of the light guide plate. Optionally, the light emergent surface and the backlight surface of the light guide plate can be parallel to each other. When the backlight module is configured to provide backlight for the display panel, the light emergent surface is generally disposed close to the display panel. The lights incident to the light guide plate are emergent from the light emergent surface of the light guide plate. The four surfaces of the light guide plate other than the light emergent surface and the backlight surface may be referred to as the side surfaces of the light guide plate. In the embodiments of the present disclosure, the light source module may be attached to the side surface of the light guide plate. FIG. 2 illustrates that the light source module is attached to a side surface of the light guide plate. In practical application, the light source module may also be attached to a plurality of side surfaces of the light guide plate, which is not limited in the embodiments of the present disclosure.

The light source 012 may comprise a light-emitting diode (LED) or an organic light-emitting diode (OLED). Herein, the LED may comprise a micro LED. The color of the lights emitted by the light source 012 may be monochromatic visible lights of blue or other colors, or may be ultraviolet lights or other monochromatic invisible lights.

In the embodiments of the present disclosure, the first grating group 013 and the light source 012 are both attached to the surface of the transparent block 011. For example, the light source 012 can be directly attached to the surface of the transparent block by transfer printing. The transparent block 011 in FIG. 2 can be attached to the side surface of the light guide plate 021, and the surface of the light source 012, which is attached to the transparent block 011, is parallel to the backlight surface A1. The surface of the first grating group 013, which is attached to the transparent block 011, is parallel to the light emergent surface A2, and at least one grating in the first grating group 013 may be a reflection grating (for example, each grating in the first grating group 013 can be a reflection grating). All the gratings in the first grating group 013 can perform reflective diffraction on the incident initial lights to generate first diffracted lights, and control the first diffracted lights to be totally reflected in the light guide plate 021 and transmitted to the second grating group 022. For example, each of the gratings in the first grating group 013 may be a reflection grating. Each of the gratings in the first grating group 013 is configured to perform diffraction on the incident initial lights to generate the first diffracted lights, and control the first diffracted lights to be totally reflected in the light guide plate 021 and transmitted to the second grating group 022. The second grating group 022 in FIG. 2 may be attached to the backlight surface A1 of the light guide plate 021, and the second grating group includes at least one reflection Bragg grating (for example, each grating in the second grating group can be a reflection Bragg grating). The gratings in the second grating group 022 can perform reflective diffraction on the incident first diffracted lights to generate second diffracted lights, and control the second diffracted lights to be emergent from light emergent surface A2 of the light guide plate 021. For example, each of the gratings in the second grating group may be a reflection Bragg grating. Each of the gratings in the second grating group 022 can perform diffraction on the incident first diffracted lights to generate the first diffracted lights, and control the second diffracted lights to be emergent from light emergent surface A2 of the light guide plate 021. Here, reflective diffraction refers to that the lights generated through diffraction and the incident lights are located at the same side. That is, the above-mentioned initial lights and the first diffracted lights are located at the same side.

Figure 3:
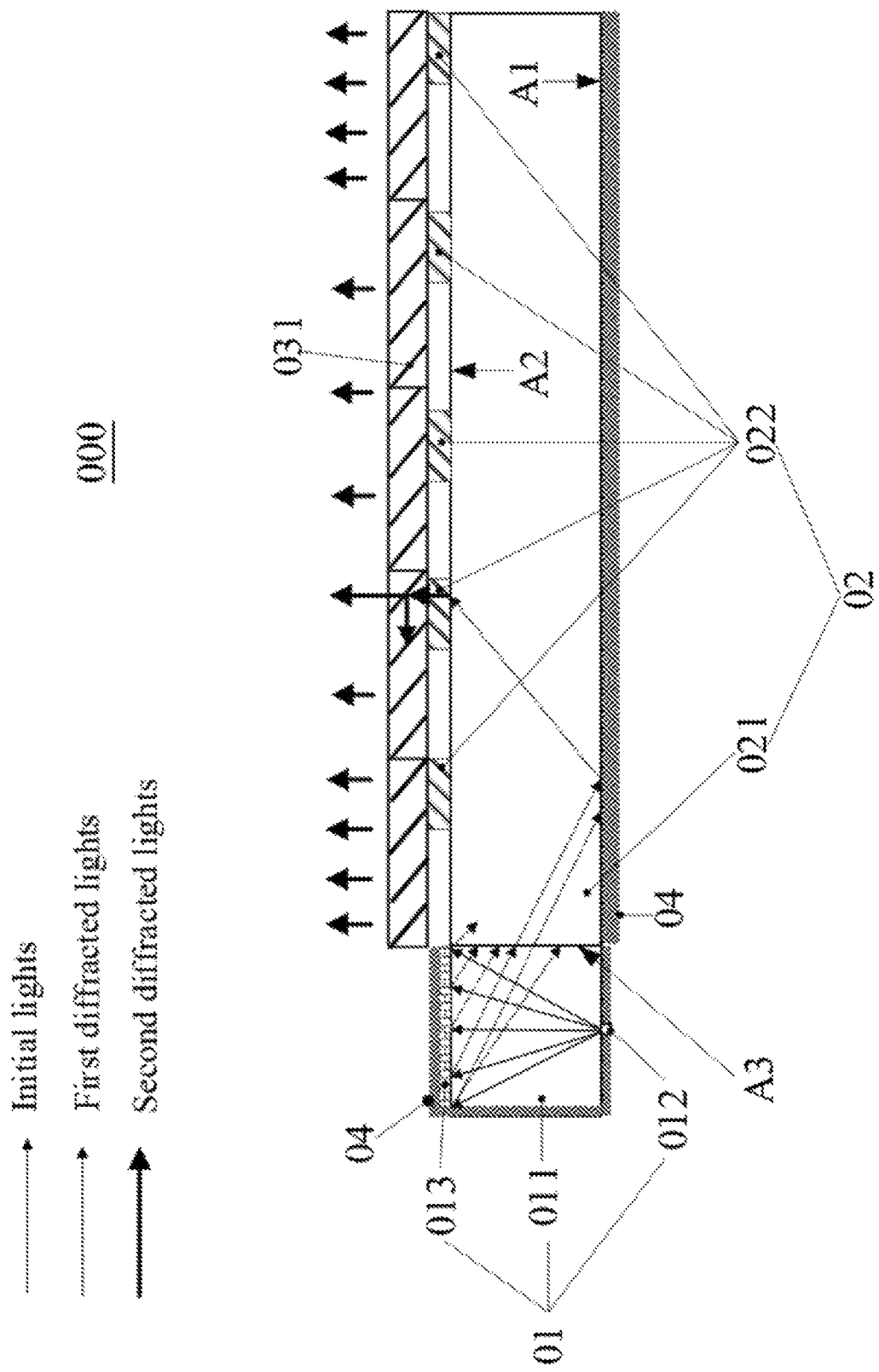
FIG. 3 is a schematic diagram of a structure of another backlight module according to an embodiment of the present disclosure.

FIG. 3 is a schematic diagram of a structure of another backlight module according to an embodiment of the present disclosure. As shown in FIG. 3, on the basis of FIG. 2, the second grating group 022 can also be attached to the light emergent surface A2 of the light guide plate 021. At least one grating in the second grating group 022 may be a transmission Bragg grating (for example, each grating in the second grating group 022 can be a transmission Bragg grating). The gratings in the second grating group 022 can perform transmissive diffraction on the incident first diffracted lights to generate second diffracted lights, and control the second diffracted lights to be emergent from the light emergent surface A2 of the light guide plate 021. For example, each of the gratings in the second grating group 022 may be a transmission Bragg grating, and each of the gratings in the second grating group 022 can perform transmissive diffraction on the incident first diffracted lights to generate second diffracted lights, and control the second diffracted lights to be emergent from the light emergent surface A2 of the light guide plate 021. Here, transmissive diffraction refers to that the lights generated through diffraction and the incident lights are located at the different sides. That is, the above-mentioned initial lights and the first diffracted lights are located at the different sides.

Figure 4:
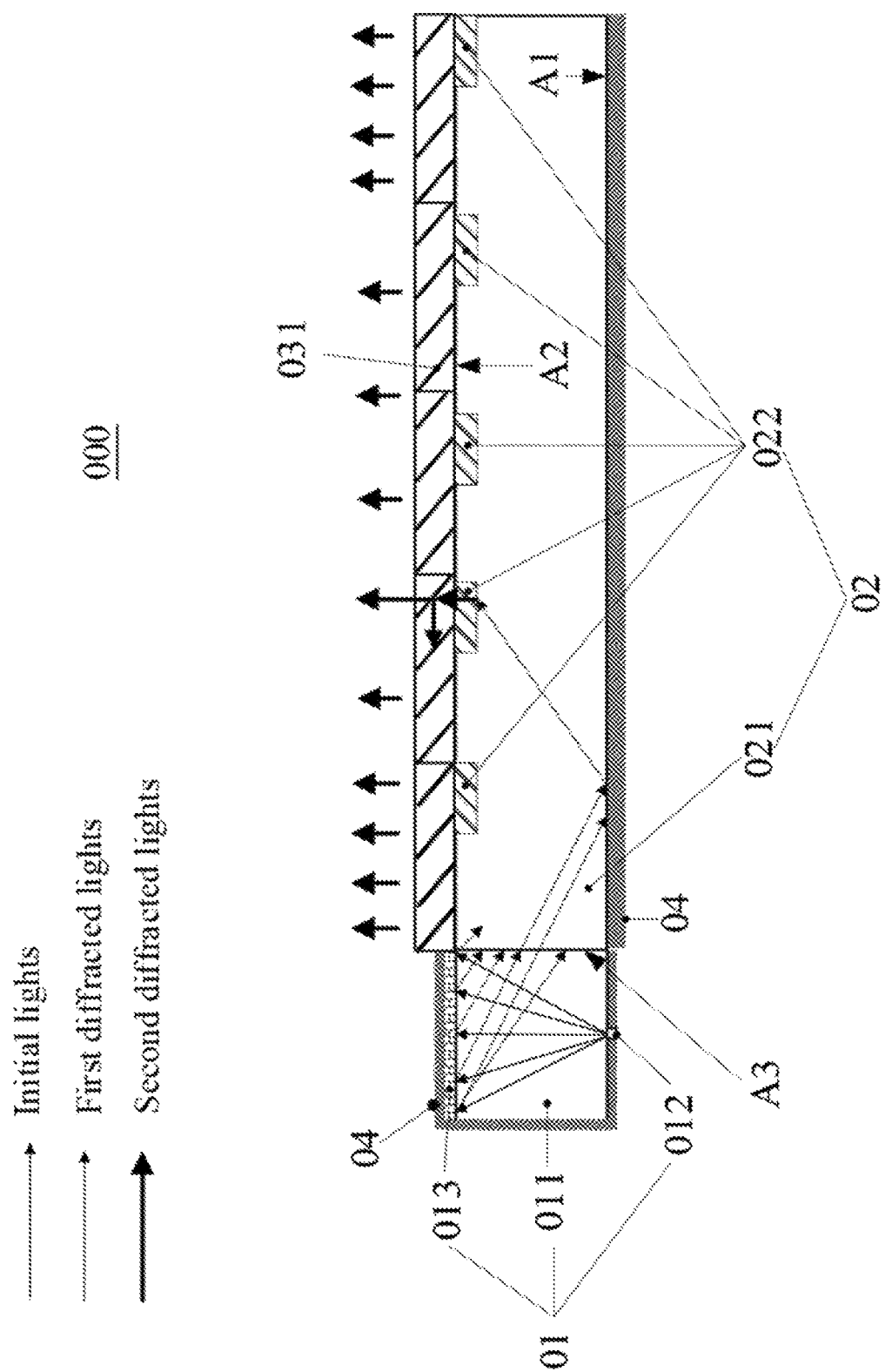
FIG. 4 is a schematic diagram of a structure of yet another backlight module according to an embodiment of the present disclosure.

FIG. 4 is a schematic diagram of a structure of still another backlight module according to an embodiment of the present disclosure. As shown in FIG. 4, on the basis of FIG. 3, the second grating group in FIG. 3 can also be attached to the light emergent surface A2 of the light guide plate 021 by way of inlaying.

Figure 5:
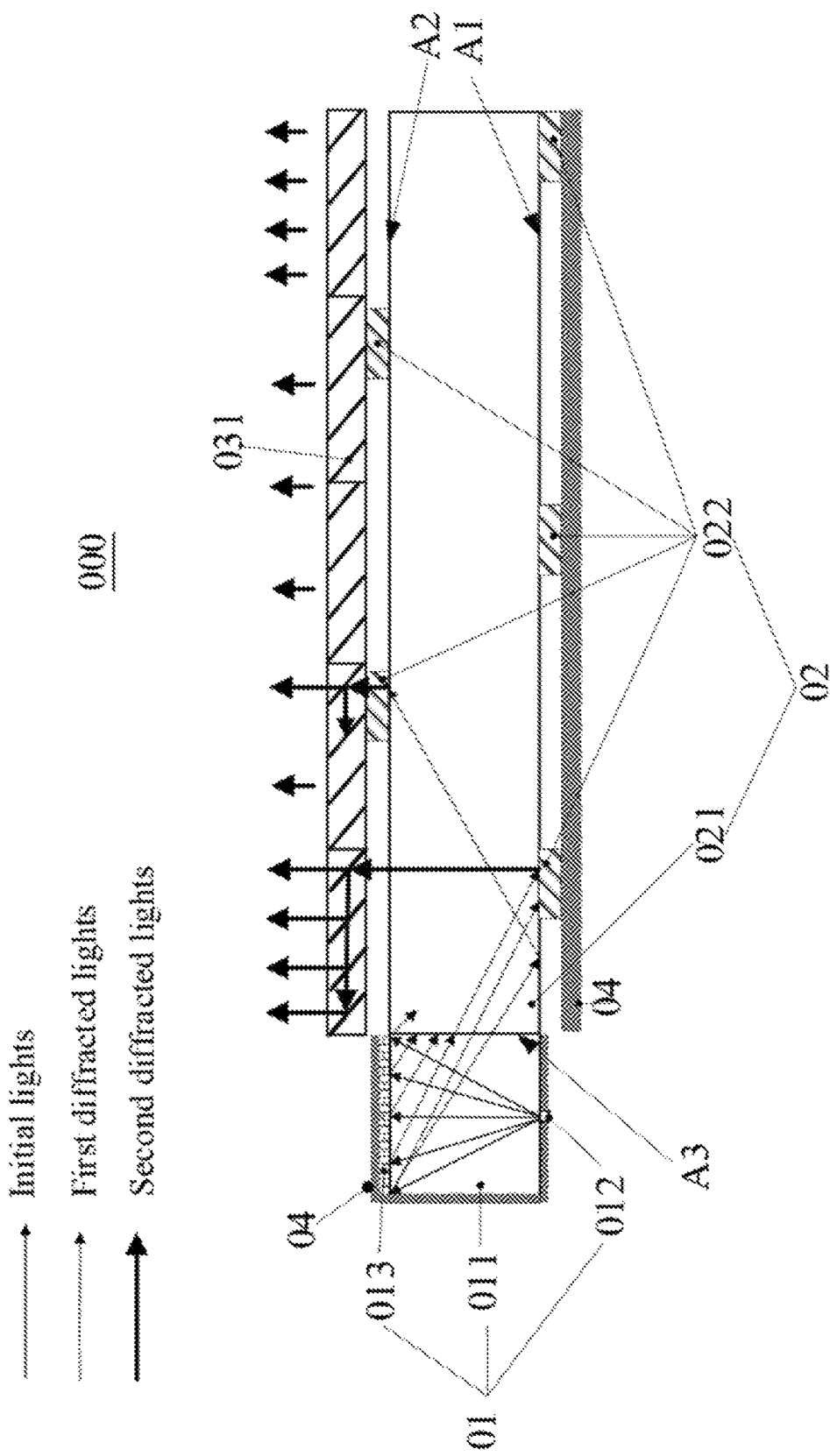
FIG. 5 is a schematic diagram of a structure of still yet another backlight module according to an embodiment of the present disclosure.

FIG. 5 is a schematic diagram of a structure of still another backlight module according to an embodiment of the present disclosure. As shown in FIG. 5, on the basis of FIG. 2, a part of the gratings in the second grating group 022 may be attached to the backlight surface A1 of the light guide plate 021, the other part of the gratings may be attached to the light emergent surface A2 of the light guide plate 021. Herein, the gratings attached to the backlight surface A1 are reflection Bragg gratings. The gratings attached to the light emergent surface A2 are transmission Bragg gratings. Moreover, orthogonal projection areas of any two gratings in the second grating group 022 on the light emergent surface A2 do not overlap. The gratings attached to the backlight surface A1 and the gratings attached to the light emergent surface A2 may be disposed at an interval one by one. The gratings (reflection Bragg gratings) attached to the backlight surface A1 in the second grating group 022 can perform reflective diffraction the incident first diffracted lights to generate second diffracted lights, and control the second diffracted lights to be emergent from the light emergent surface A2 of the light guide plate 021. The gratings (transmission Bragg gratings) attached to the light emergent surface A2 in the second grating group 022 can perform transmissive diffraction on the incident first diffracted lights to generate second diffracted lights, and control the second diffracted lights to be emergent from the light emergent surface A2 of the light guide plate 021.

Figure 6:
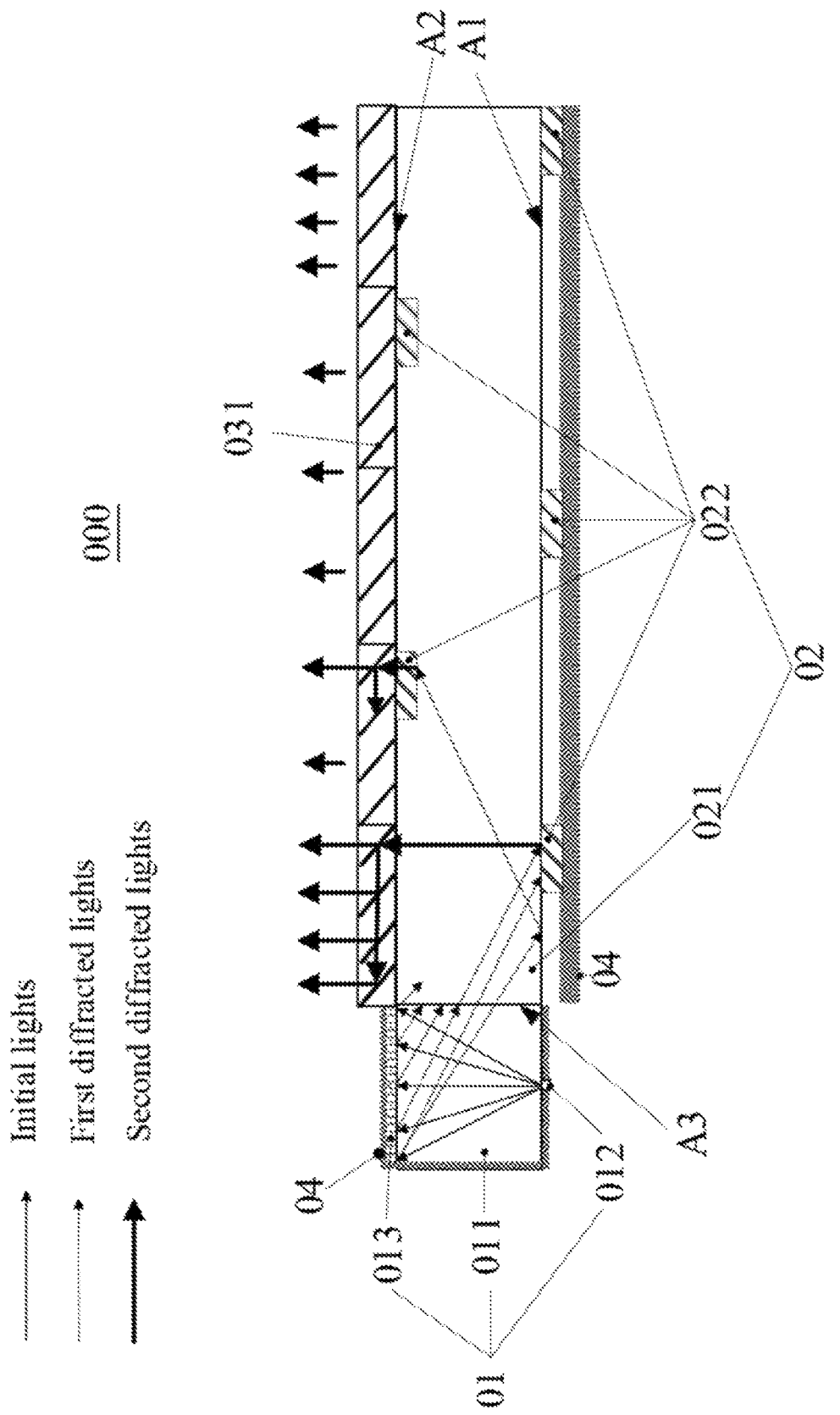
FIG. 6 is a schematic diagram of a structure of a backlight module according to another embodiment of the present disclosure.

FIG. 6 is a schematic diagram of a structure of a backlight module according to another embodiment of the present disclosure. As shown in FIG. 6, on the basis of FIG. 5, the gratings in the second grating group which are disposed on the light emergent surface A2 in FIG. 5 may also be attached to the light emergent surface A2 of the light guide plate 021 by the way of inlaying.

It should be noted that in each backlight module shown in FIG. 2 to FIG. 6, the first grating group 013 may also be attached to the side surface A3 of the light guide plate 021. The transparent block 011 may be located on a side of the first grating group 013 away from the light guide plate 021, and the light source 012 is located on a side of the transparent block 011 away from the first grating group 013. That is, the first grating group 013 is respectively attached to the surface A3 of the light guide plate 021 and the surface of the transparent block 011. At this point, the first grating group 013 is located between the light guide plate 021 and the transparent block 011, and at least one grating in the first grating group 013 may be a transmission grating. For example, each of the gratings in the first grating group 013 may be a transmission grating.

Figure 7:
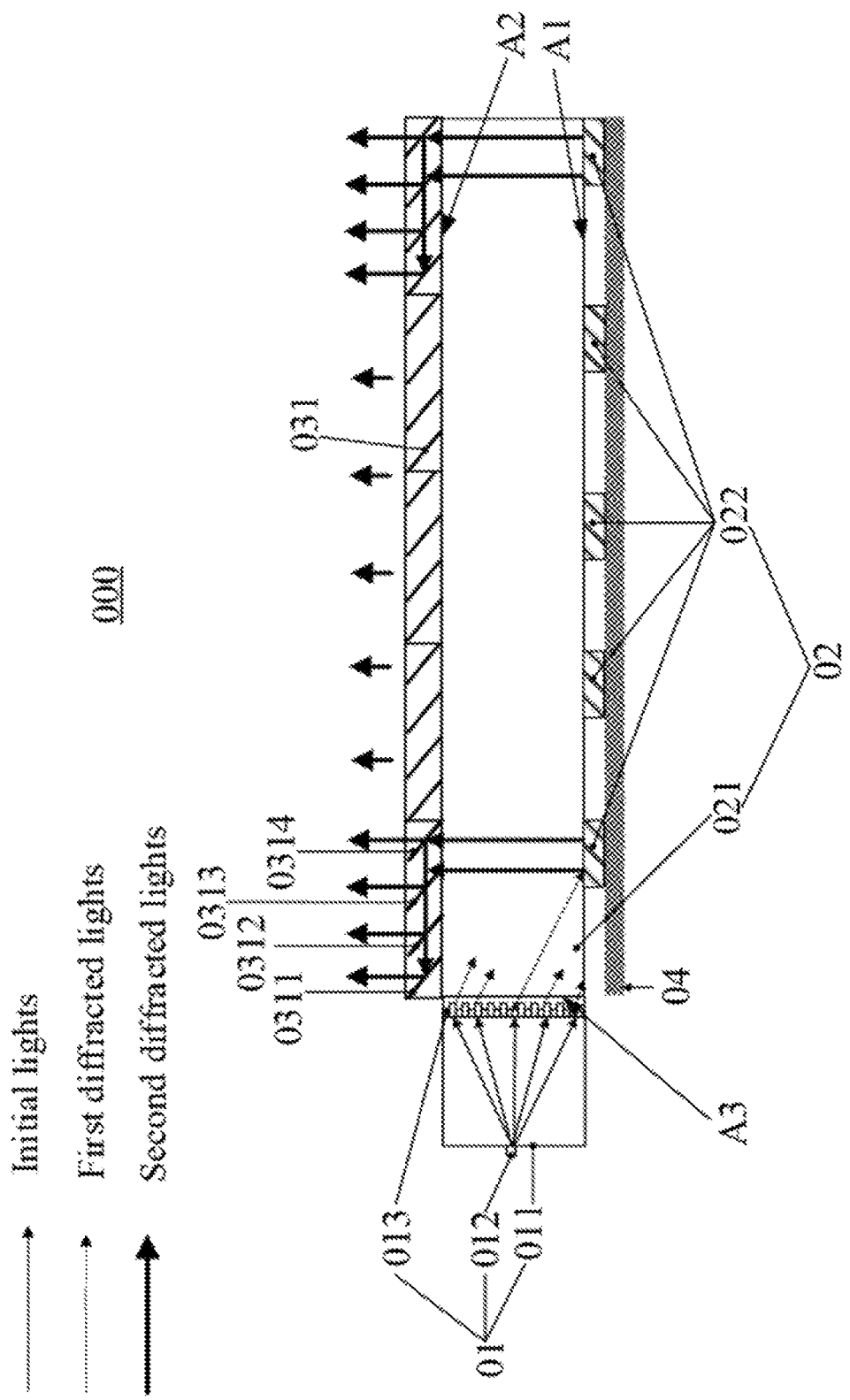
FIG. 7 is a schematic diagram of a structure of another backlight module according to another embodiment of the present disclosure.

Exemplarily, FIG. 7 is a schematic diagram of a structure of another backlight module according to another embodiment of the present disclosure. As shown in FIG. 7, on the basis of FIG. 2, the first grating group 013 may also be attached to the side surface A3 of the light guide plate 021. That is, the first grating group 013 can be attached to the side surface A3 of the light guide plate 021 and the surface of the transparent block 011 respectively. At this point, the first grating group 013 is located between the light guide plate 021 and the transparent block 011. At least one grating in the first grating group 013 may be a transmission grating (for example, each grating in the first grating group 013 can be a transmission grating). The gratings in the first grating group 013 can perform transmissive diffraction on the incident initial lights to generate first diffracted lights, and control the first diffracted lights to be totally reflected in the light guide plate 021 and transmitted to the second grating group 022. For example, each of the gratings in the first grating group 013 may be a transmission grating, each of the gratings in the first grating group 013 can perform transmissive diffraction on the incident initial lights to generate first diffracted lights, and control the first diffracted lights to be totally reflected in the light guide plate 021 and transmitted to the second grating group 022. Optionally, a side of the first grating group 013 away from the transparent block 011 may be formed with a flat layer (not shown in FIG. 7). The first grating group 013 may be attached to the side surface of the light guide plate through the flat layer.

It should be noted that in the backlight module shown in any one of FIG. 2 to FIG. 6, each backlight module comprises only one light source module and one light emergent module. In practical application, the number of the light source module or the light emergent module in the backlight module may not be one. For example, the backlight module comprises one light source module and two light emergent modules, the one light source module is disposed between the two light emergent modules and is respectively attached to the side surfaces of the light guiding plates of the two light emergent modules. Alternatively, the backlight module comprises two light source modules and two light emergent modules, and the two light source modules and the two light emergent modules are disposed at an interval one by one.

Figure 8:
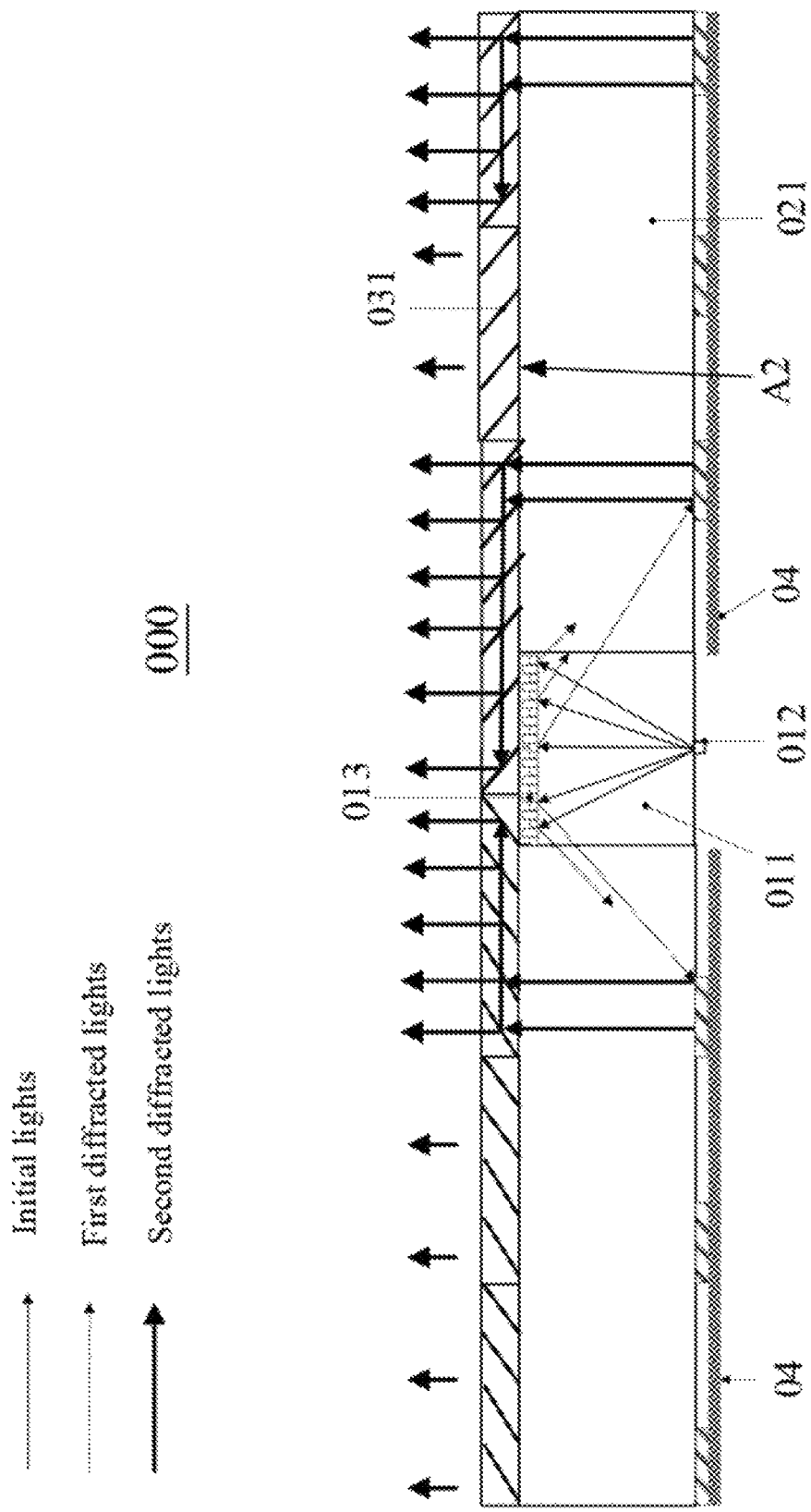
FIG. 8 is a schematic diagram of a structure of yet another backlight module according to another embodiment of the present disclosure.

Exemplarily, FIG. 8 is a schematic diagram of a structure of still another backlight module according to another embodiment of the present disclosure. As shown in FIG. 8, on the basis of FIG. 2, the backlight module may further comprise a light emergent module. The transparent block 011 in the light source module may be respectively attached to the light guide plates 021 of the two light emergent modules. The first diffracted lights generated by the reflective diffraction of the first grating group 013 in the light source module can be respectively incident on the two light guide plates 021 of the two light emergent modules, so that the gratings (the reflection Bragg grating in the second grating group) disposed on the backlight side A1 of each light guide plate 021 can perform reflective diffraction on the first diffracted lights to generate second diffracted lights. Optionally, a side of the first grating group 013 away from the transparent block 011 may be formed with a flat layer (not shown in FIG. 8). The flat layer may be flush with the light emergent surface A2 of the light guide plate.

Further, the backlight module 000 shown in any one of FIG. 2 to FIG. 8 may further comprise a semi-transparent film group. The semi-transparent film group may comprise a plurality of semi-transparent films 031. The semi-transparent film group is disposed on the side of the light emergent surface A2 of the light guide plate 021, and the second diffracted lights emergent from the second grating group 022 can be incident to the semi-transparent film group. The semi-transparent films 031 in the semi-transparent film group has an included angle with the light emergent surface A2. That is, the semi-transparent films in the semi-transparent film group may be obliquely disposed on the light emergent surface. For example, each of the semi-transparent films in the semi-transparent film group is obliquely disposed on the light emergent surface. The semi-transparent films 031 can be configured to reflect a part of the incident second diffracted lights to other semi-transparent films 031, and to transmit the other part of the incident second diffracted lights, so that the second diffracted lights can be uniformly emergent from the backlight module.

It should be noted that, in the backlight module shown in FIG. 8, not only the light emergent side of the light guide plate but also the side of the first grating group away from the transparent block can be provided with the semi-transparent films 031.

Exemplarily, the semi-transparent films 031 in the backlight module may comprise first semi-transparent films and second semi-transparent films. The second diffracted lights incident on the first semi-transparent films are more than the second diffracted lights incident on the second semi-transparent films. A light transmittance of the first semi-transparent films is smaller than a light transmittance of the second semi-transparent films. That is, in the plurality of semi-transparent films 031, the light transmittance of the semi-transparent films 031 having a larger amount of light incidence is smaller than the light transmittance of the semi-transparent films 031 having a smaller amount of light incidence. In the embodiments of the present disclosure, the light transmittance of the semi-transparent films 031 is reasonably designed according to the amount of light incidence of the semi-transparent films 031, thereby further enabling the amount of lights transmitted from the plurality of semi-transparent films 031 to be uniform, and improving the uniformity of the lights emergent from the backlight module. Further, in order to ensure the uniform lights emergent from the backlight module, a ratio of the reflectance to the light transmittance of the plurality of semi-transparent films may be changed in a gradual manner.

For example, as shown in FIG. 7, among the four semi-transparent films 031 disposed on a side, close to the light source module 01, of the light emergent surface A2 of the light guide plate 021, the semi-transparent film 0311, the semi-transparent film 0312, the semi-transparent film 0313, and the semi-transparent film are sequentially disposed in a direction away from the light source module 01. Further, the second diffracted lights incident on the semi-transparent film 0311, the semi-transparent film 0312, the semi-transparent film 0313, and the semi-transparent film 0314 are sequentially increased. In any two semi-transparent films, a semi-transparent film having more incident second diffracted lights may be referred to as a first semi-transparent film, and a semi-transparent film having less incident second diffracted lights may be referred to as a second semi-transparent film. For example, in the semi-transparent film 0311 and the semi-transparent film 0312, the semi-transparent film 0312 is referred to as a first semi-transparent film, and the semi-transparent film 0311 is referred to as a second semi-transparent film. In the semi-transparent film 0313 and the semi-transparent film 0314, the film 0314 is referred to as a first semi-transparent film, and the semi-transparent film 0313 is referred to as a second semi-transparent film. Based on the amount of the second diffracted lights incident into the first semi-transparent film and the second semi-transparent film, the light transmittance of the first semi-transparent film may be set to be small, and the light transmittance of the second semi-transparent film may be set to be large. For example, the light transmittance of the semi-transparent film 0311 is set to 100%, the light transmittance of the semi-transparent film 0312 is set to 90%, the light transmittance of the semi-transparent film 0313 is set to 80%, and the light transmittance of the semi-transparent film 0314 was set to 70%.

Optionally, the plurality of semi-transparent films 031 may be arranged in an array, and the plurality of semi-transparent films 031 have the same shape and area. That is, the plurality of semi-transparent films 031 are arranged orderly, so that the amount of lights transmitted from the plurality of semi-transparent films 031 is relatively uniform, thereby further improving the uniformity of the lights emergent from the backlight module.

In addition, referring to any one of FIG. 2 to FIG. 6, on the side of the light emergent surface A2 of the light guide plate, the area in the backlight module 000 where the light guide plate is not disposed may be wrapped with a light absorbing layer 04. Exemplarily, on a side of the light emergent surface of the light guide plate, an area in the backlight module other than an area where the backlight module is provided is wrapped by a light absorbing layer 04. In the backlight module 000 shown in any one of FIG. 2 to FIG. 8, the light absorbing layer 04 may also wrap at least one side other than the side where the light emergent surface A2 of the light guide plate is located. The light absorbing layer 04 can absorb stray lights from the backlight module other than the light emergent surface of the light guide plate, to prevent the influence of the stray lights on the collimation degree of the lights emergent from the backlight module.

The light guide plate in the backlight modules shown in FIG. 2 to FIG. 6 and FIG. 8 may be connected to the transparent block as an integrated piece. In the backlight modules shown in FIG. 2 to FIG. 8, the material of the light guide plate may be a transparent material such as indium tin oxide or silicon nitride. The thickness of the light guide plate may be 1 mm or even thinner to dozens of micrometers. The refractive index of the light guide plate may be 1.5. The material of the light absorbing layer may be the same as the material of a black matrix in the display panel. The first grating may be a generalized grating such as a strip grating, a bulk grating, a holographic grating or a blazed grating. The second grating is a Bragg grating. The material of the Bragg grating may be a photopolymer.

Figure 9:
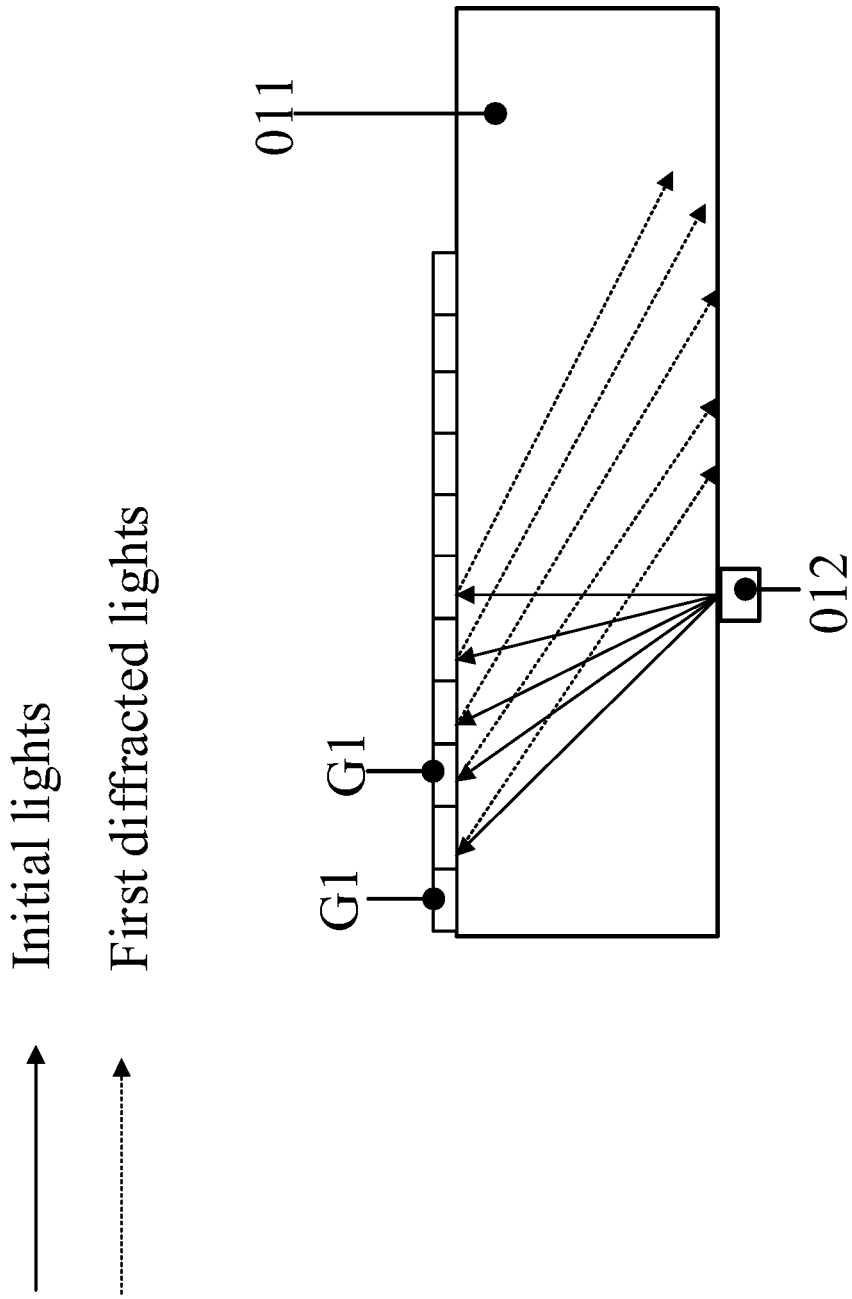
FIG. 9 is a schematic diagram of a structure of a first grating group according to another embodiment of the present disclosure.

FIG. 9 is a schematic diagram of a structure of a first grating group according to an embodiment of the present disclosure. The first grating group may be the first grating group 013 in the backlight modules shown in FIG. 2, FIG. 3, FIG. 4, FIG. 5, FIG. 6 and FIG. 8. As shown in FIG. 9, the gratings in the first grating group may be referred to as first gratings G1, and the first grating group may comprise a plurality of first gratings G1. The parameters of any two of the plurality of first gratings G1 are different. Each first grating G1 can perform reflective diffraction on the initial lights in an incident angle range to generate first diffracted lights. It should be noted that in the backlight module shown in FIG. 7, the first grating group 013 may also comprise a plurality of first gratings, and each first grating can perform transmissive diffraction on the lights in an incident angle range to generate first diffracted lights.

Figure 10:
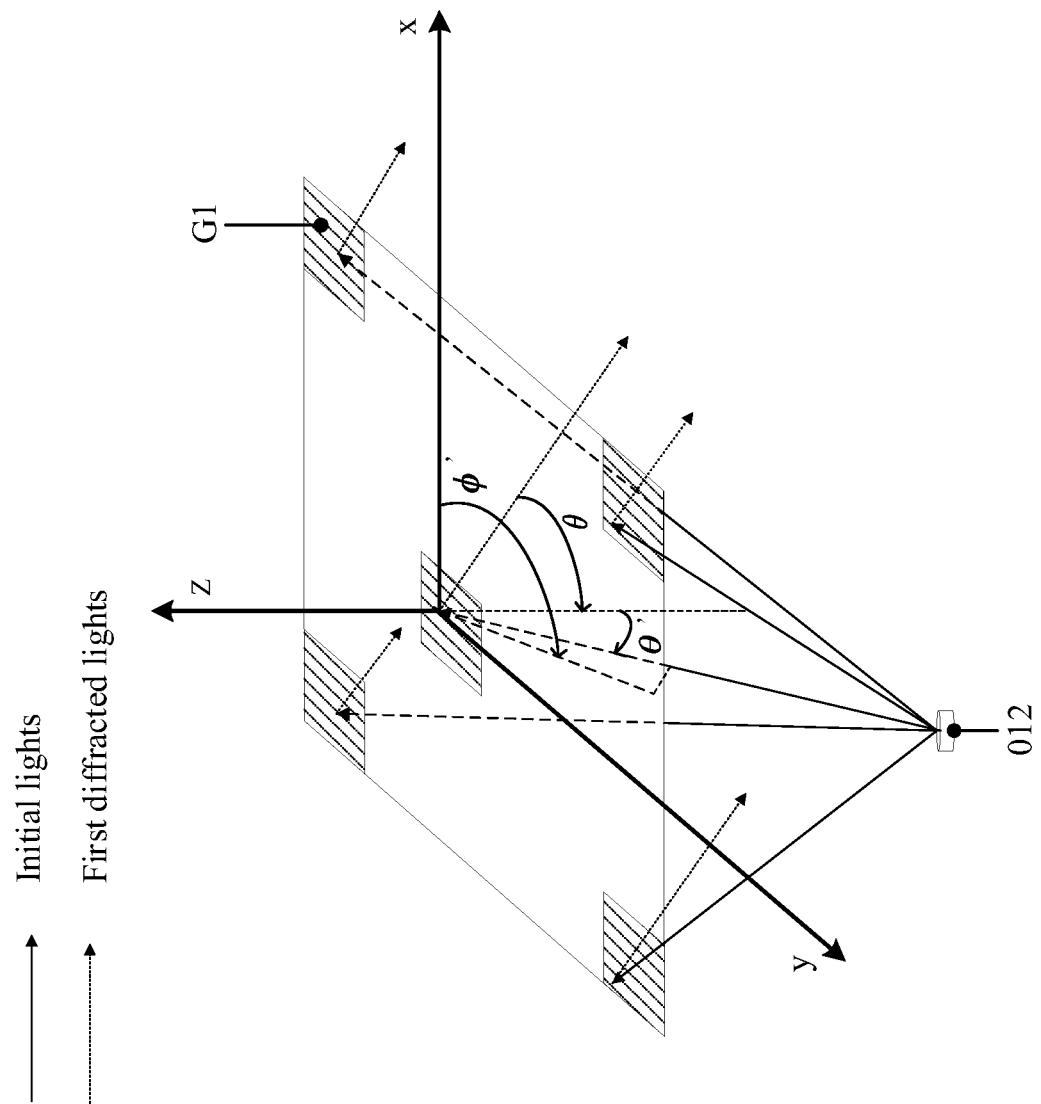
FIG. 10 is a schematic diagram of first diffracted lights generated by the first grating group in FIG. 9 according to another embodiment of the present disclosure.

FIG. 10 is a schematic diagram of the first diffracted lights generated by the first grating group in FIG. 9 according to an embodiment of the present disclosure. As shown in FIG. 10, it is assumed that the initial lights emergent from the light source 012 are distributed in a three-dimensional space xyz. In the three-dimensional space xyz, the first grating group 031 comprises a plurality of first gratings G1, and the plurality of first gratings G1 may all be located within the xy plane (that is, the plane in which the x axis and the y axis are located), and each of the first gratings G1 corresponds to the initial lights in an incident angle range. For any of the plurality of initial lights emergent from the light source, an included angle between the initial lights and the z-axis in the three-dimensional space xyz is θ', and an azimuth angle of the initial lights is φ', (the azimuth angle is the included angle between the projection of the initial lights on the xy plane and the x-axis). An included angle between the first diffracted lights generated by diffracting such initial lights through the first grating and the z-axis in the three-dimensional space xyz is θ, and an azimuth angle of the first diffracted lights is φ (the azimuth angle is the included angle between the projection of the first diffracted lights on the xy plane and the x-axis, and not shown in FIG. 10). Herein, θ', φ', θ and φ have the following relationship:

$$\sin\theta = \frac{1}{n}\sqrt{n_1 \sin^2\theta' \sin^2\phi' + \left[n_1 \sin\theta' \cos\phi' + \frac{\lambda}{d}\right]^2};$$

$$\tan\phi = \frac{n_1 \sin\theta' \sin\phi'}{n_1 \sin\theta' \cos\phi' + \frac{\lambda}{d}};$$

Where d is the grating period, λ is the wavelength of the lights, and $n_1$ is the refractive index of the first grating. Exemplarily, the first grating may have a refractive index of 2.0.

In the embodiments of the present disclosure, the propagation directions of all the first diffracted lights generated by diffracting of the first grating group 013 may be designed to be parallel to each other and parallel to a same plane. It is assumed that the same plane is the xz plane (i.e., the plane in which the x-axis and the z-axis are located). At this point, the azimuth angle φ of each of the first diffracted lights is 0 degree. A preliminary design is performed on the first grating group according to the above relationship of θ', φ', θ and φ, as well as the initial lights emitted by the light source.

It is assumed that a transmission angle of the first diffracted lights in the light guide plate (the included angle between the first diffracted lights and the side surface of the light guide plate) is 65 degrees. When the first grating group is designed, in the initial lights on the right side of the initial lights emergent from the light source, the initial lights with the incident angles of 2.5 degrees, 5 degrees, 10 degrees, 15 degrees, 20 degrees, 25 degrees, 30 degrees and 35 degrees on the first grating group may be selected. Then, a first grating can be designed for the selected initial lights, so that the azimuth angle φ of the first diffracted lights generated by diffracting of first grating is 0 degree. Exemplarily, the first grating group may comprise eight first gratings, the eight first gratings correspond to eight incident angle ranges in total, and the eight incident angle ranges may comprise eight incident angles: 2.5 degrees, 5 degrees, 10 degrees, 15 degrees, 20 degrees, 25 degrees, 30 degrees, and 35 degrees respectively. The parameters of the eight first gratings (which are the first grating 1, the first grating 2, the first grating 3, the first grating 4, the first grating 5, the first grating 6, the first grating 7, and the first grating 8 respectively) can be as shown in Table 1.

TABLE 1

| First grating | 1 | 2 | 3 | 4 | 5 | 6 | 7 | 8 |
|---|---|---|---|---|---|---|---|---|
| Emergent angle/degrees | 2.5 | 5 | 10 | 15 | 20 | 25 | 30 | 35 |
| Period/Nanometer | 530 | 565 | 660 | 780 | 950 | 1230 | 1700 | 2450 |
| Height/Nanometer | 262 | 284 | 230 | 237 | 226 | 246 | 330 | 275 |
| Duty cycle | 61% | 46% | 68% | 50% | 38% | 45% | 55% | 68% |

In addition, it should be noted that the initial lights emergent from the light source usually have in a Lambertian distribution, and the energy of the initial lights emergent from the light source is mainly concentrated in the initial lights with an emergent angle of −60 degrees to +60 degrees. After the initial lights pass by the transparent block, the divergence angle of the initial lights incident to the first grating group will be converged between −35 degrees and +35 degrees. In the process of designing the first grating, one of the initial lights can be selected every 5° incident angle to design the first grating, and finally the transmission angle of the first diffracted lights generated by diffracting such initial lights through the first grating group is 65 degrees. However, it should be noted that the initial lights incident to each first grating are the initial lights within an incident angle range, that is, the initial lights incident to each first grating are more. Therefore, the first diffracted lights generated by diffracting of each first grating further comprise the first diffracted lights of which the transmission angle in the light guide plate is not 65 degrees.

Figure 11:
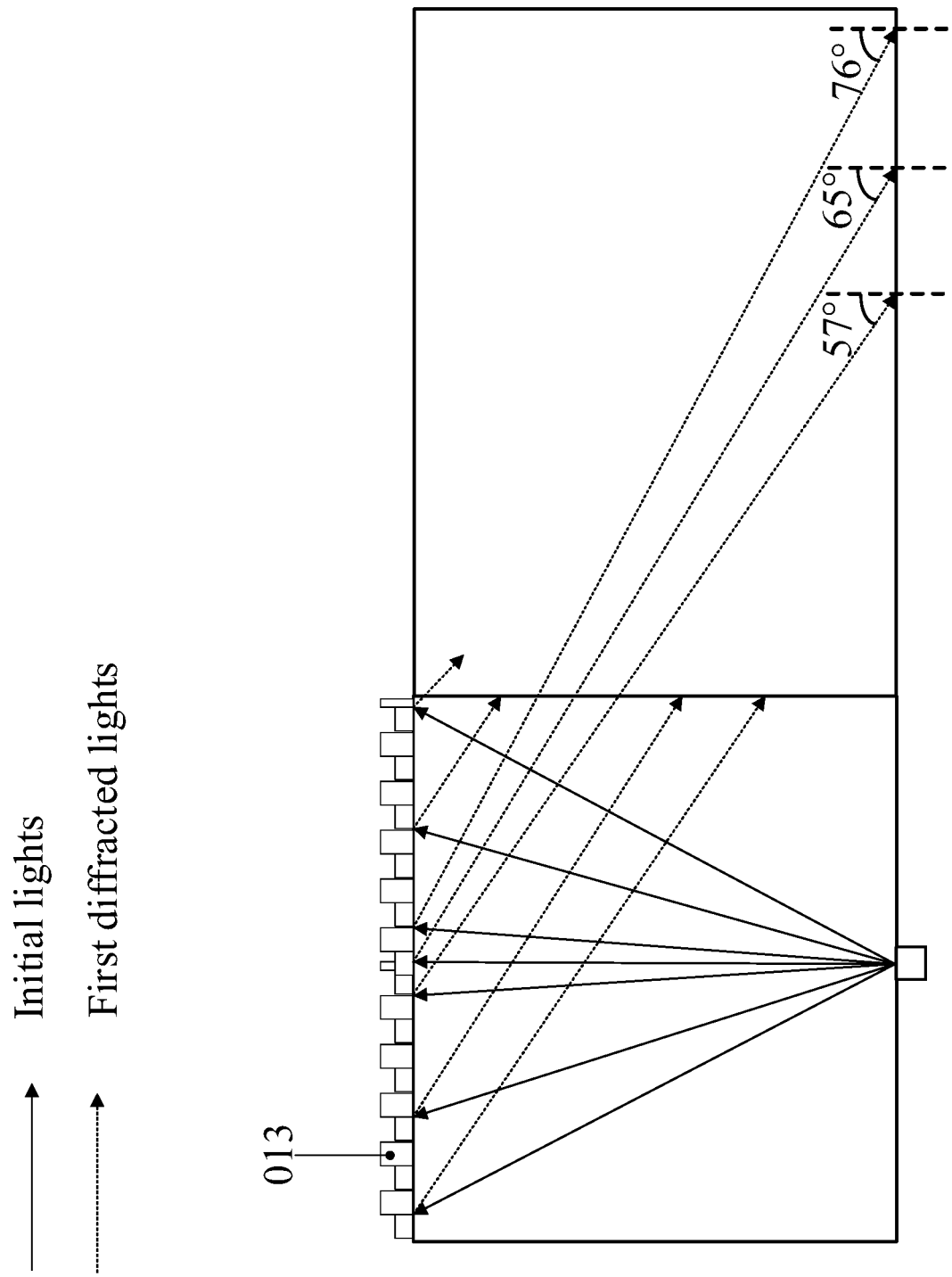
FIG. 11 is a schematic diagram of a transmission angle of the first diffracted lights according to another embodiment of the present disclosure.

It is experimentally found that the transmission angle of the first diffracted lights generated by the first grating group in the light guide plate ranges from 57 degrees to 76 degrees (as shown in FIG. 11), and each of the first diffracted lights can be totally reflected and transmitted in the light guide plate. At this point, the first diffracted lights are subjected to preliminary collimation, and the first diffracted lights are totally reflected and transmitted in the light guide plate. It should be noted that the "degree" can also be expressed as "°".

The second gratings in the second grating group 022 may be a Bragg grating (for example, each of the second gratings in the second grating group 022 is a Bragg grating), and the Bragg grating can only diffract the incident lights of one incident angle and has no effect on the incident lights of other angles (at this time, the incident lights of other angles are transmitted along the original path after being incident to the gratings). The diffraction modulation efficiency of the Bragg grating can reach 99% or more. A plurality of included angles exist between all the first diffracted lights generated by diffracting of the first grating group and the side surface. The plurality of included angles and the plurality of second gratings are in one-to-one correspondence. The included angle corresponding to each second grating is equal to a Bragg angle of the second grating. That is, the second gratings in the second grating group can diffract all the first diffracted lights generated by diffracting of the first grating group. A plurality of included angles are formed between the plurality of first diffracted lights generated by the diffracting of the first grating group and the side surface, and angle values of the plurality of included angles belong to a set of angle values of Bragg angles of the plurality of second gratings.

Based on the characteristics of the Bragg grating, it can be known that when the first diffracted lights incident in the second grating group 022 have multiple transmission angles in the light guide plate, the second grating group 022 needs to be designed as a relatively complicated structure (the second grating group 022 needs to comprise a plurality of second gratings). Therefore, the second grating group can simultaneously diffract the first diffracted lights of multiple transmission angles. In the embodiments of the present disclosure, since the first grating group diffracts all the initial lights to a direction parallel to the same plane, the first diffracted lights incident in the second grating group have less transmission angles in the light guide plate. Therefore, the structure of the second grating group 022 is simplified, and the number of the second gratings in the second grating group 022 is reduced.

In the embodiments of the present disclosure, a plurality of second gratings (Brag gratings) are attached to at least one surface of the light emergent surface and the backlight surface of the light guide plate, and the length of each second grating may be equal to an overall length of the first grating group, so that the first diffracted lights with an emergent angle ranging from 57 degrees to 76 degrees can be respectively diffracted by the plurality of second gratings, so as to generate the second diffracted lights having a higher collimation degree. Here, the total length of the first grating group is the length of the first grating group in the arrangement direction of the gratings (for example, the direction from left to right in FIG. 12), and the length of the second grating is the length of the second grating at a direction perpendicular to the silt thereof (for example, the direction from right to left right in FIG. 12).

The transmission angle of the first diffracted lights generated by the first grating group in the light guide plate ranges from 57 degrees to 76 degrees, and the total reflection transmission paths of these first diffracted lights in the light guide plate are different. On such basis, the second gratings can be attached on the surface of the light guide plate at the positions where the first diffracted lights with each transmission angle reach according to a geometric transmission relationship, so that the second gratings can collimate the first diffracted lights but have no effect on the lights of other transmission angles, that is, the lights of other transmission angles continue to be totally reflected and transmitted in the light guide plate.

Figure 12:
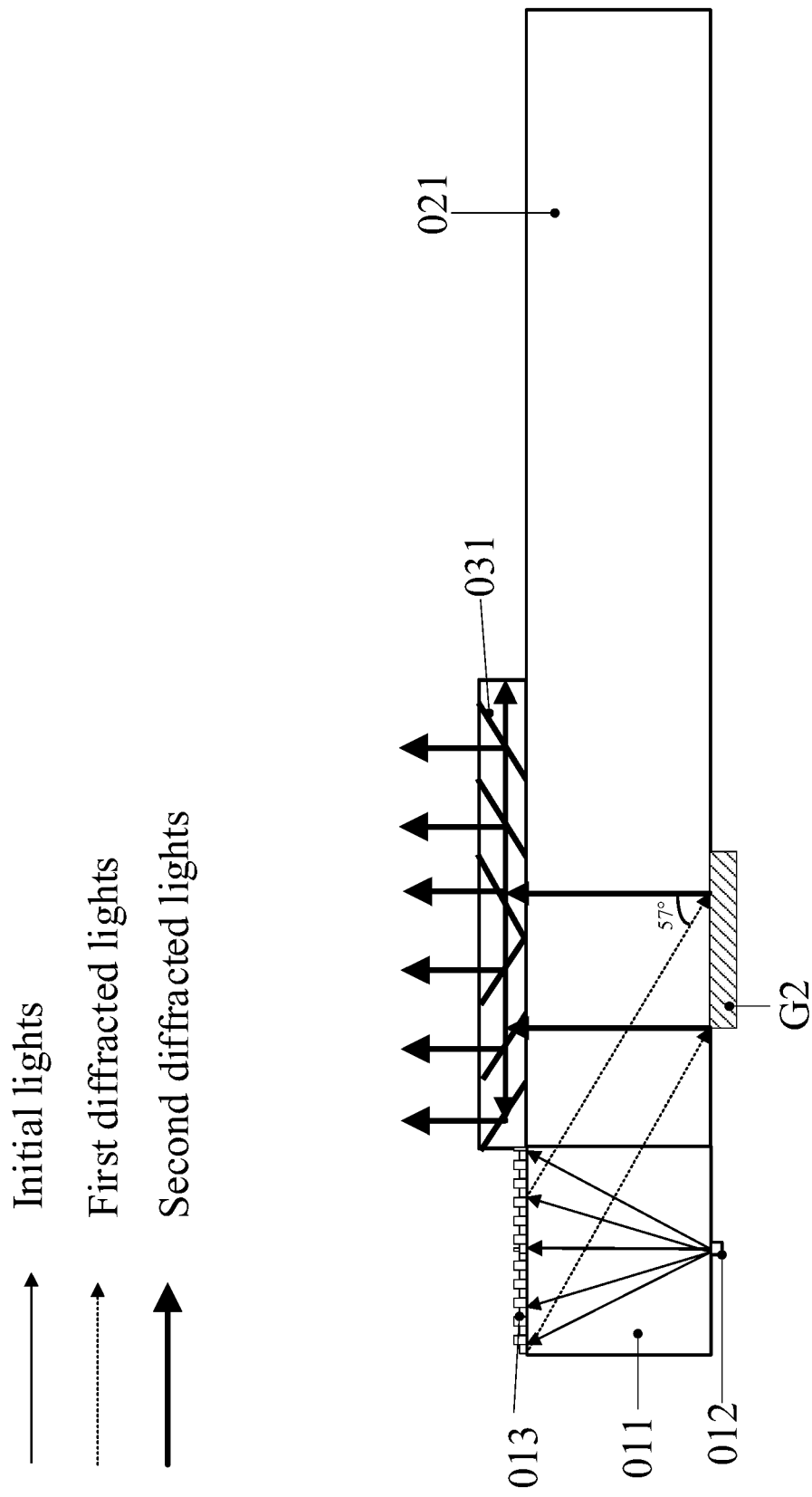
FIG. 12 is a schematic diagram of a structure of a second diffracted light rays according to an embodiment of the present disclosure.

FIG. 12 is a schematic diagram of a structure of second diffracted lights according to an embodiment of the present disclosure. As shown in FIG. 12, FIG. 12 shows that the reflective diffraction is performed on the first diffracted lights with a transmission angle of 57 degrees by the second grating to generate the second diffracted lights. According to the transmission path of the first diffracted lights with the transmission angle of 57 degrees in the light guide plate, the first second grating G2 may be attached to the surface of the light guide plate, and such first second grating G2 corresponds to the first diffracted lights with the transmission angle of 57 degrees.

The first diffracted lights incident to the light guide plate comprise the first diffracted lights with the transmission angle ranging from 57 degrees to 76 degrees. After these first diffracted lights are incident to the light guide plate, the first second grating G2 can diffract the first diffracted lights with the transmission angle of 57 degrees to generate the second diffracted lights without diffracting the lights with other transmission angles. The second diffracted lights have a small included angle with the side surface of the light guide plate, and have a higher collimation degree. At this point, the lights transmitted in the light guide plate are the first diffracted lights with the transmission angle of 58 degrees to 76 degrees.

Figure 13:
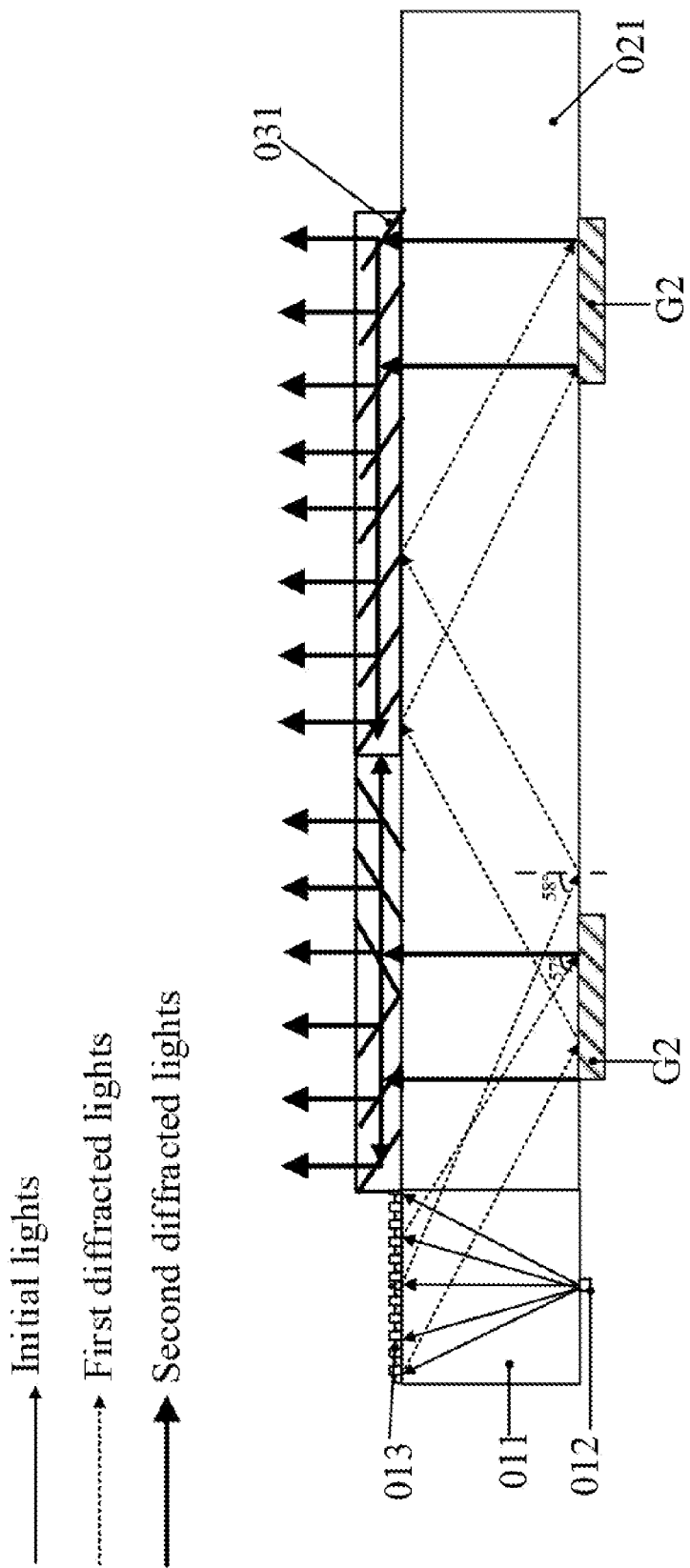
FIG. 13 is a schematic diagram of a structure of another second diffracted light rays according to an embodiment of the present disclosure.

FIG. 13 is a schematic diagram of a structure of another second diffracted lights according to an embodiment of the present disclosure. As shown in FIG. 13, FIG. 13 shows that the reflective diffraction is performed on the first diffracted lights with a transmission angle of 58 degrees by the second grating to generate the second diffracted lights. Similarly, according to the transmission path of the first diffracted light ray with the transmission angle of 58 degrees in the light guide plate, the second second grating G2 corresponding to the first diffracted lights with the transmission angle of 58 degrees is attached to the surface of the light guide plate. After passing through the second second grating G2, the first diffracted lights with the transmission angle of 58 degrees are diffracted to generate the second diffracted lights having a higher collimation degree, and the remaining first diffracted lights with the transmission angle of 59 degrees to 76 degrees continue to be totally reflected and transmitted in the light guide plate according to the original path.

Subsequently, according to the above design manner, the second gratings G2 corresponding to the first diffracted lights having the transmission angle of 59 degrees to 76 degrees may be attached to the surface of the light guide plate in sequence. Therefore, the 20 second gratings G2 corresponding to the first diffracted lights having the transmission angle of 57 degrees to 76 degrees respectively are attached to the surface of the light guide plate. It should be noted that, in order to prevent the plurality of second gratings G2 from affecting each other, the plurality of second gratings G2 may be disposed, so as to make the orthogonal projection areas the plurality of second gratings G2 on the light emergent surface do not overlap.

It should be noted that the second gratings in the second grating group in the embodiments of the present disclosure may be reflection Bragg gratings or transmission Bragg gratings. When the parameters of each type of Bragg gratings are designed, the parameters of the Bragg gratings can be reasonably designed according to the transmission angle of the required second diffracted lights.

Figure 14:
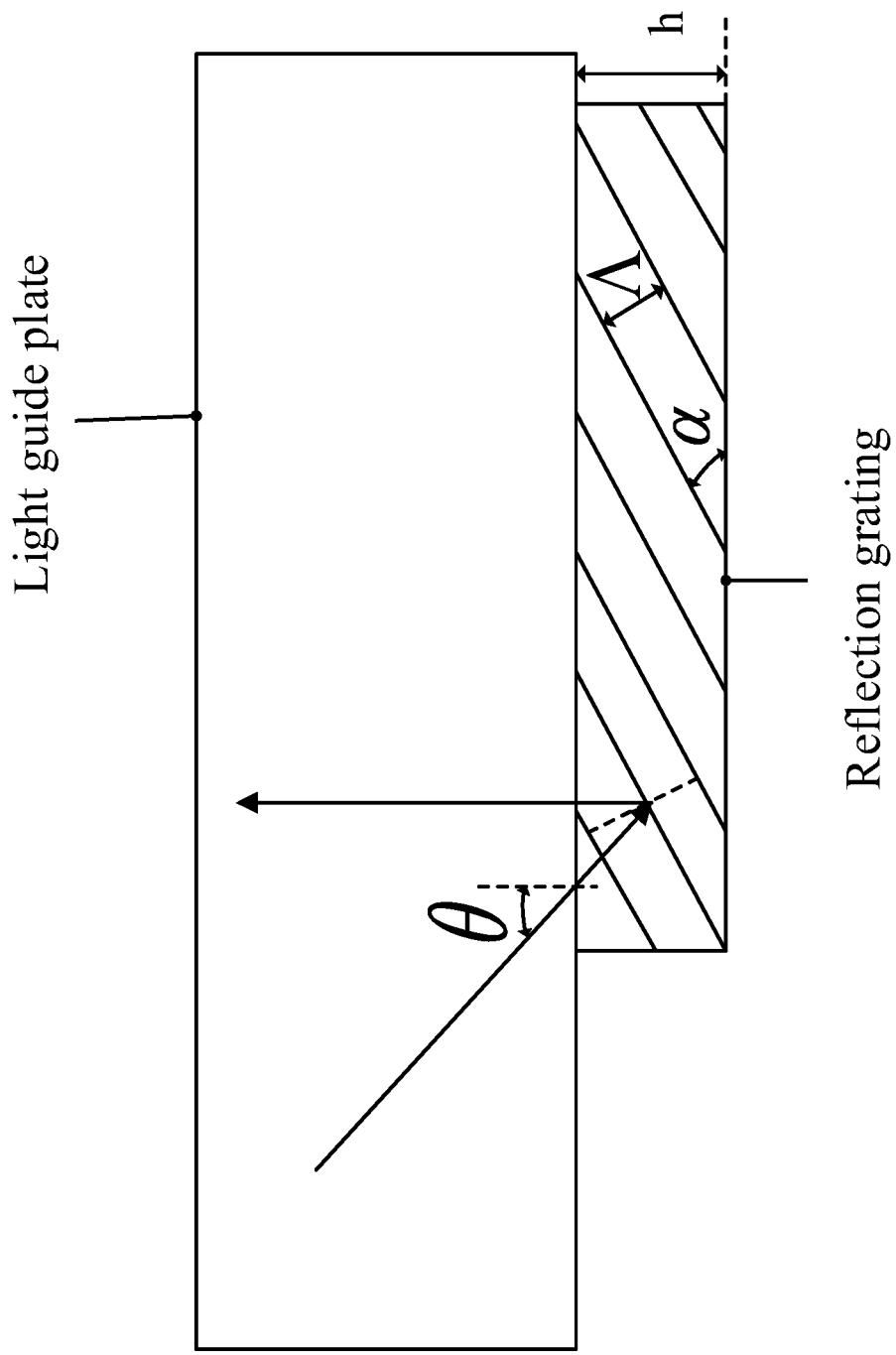
FIG. 14 is a schematic diagram of a structure of reflection Bragg grating according to an embodiment of the present disclosure.

For example, FIG. 14 is a schematic diagram of a structure of a reflection Bragg grating according to an embodiment of the present disclosure. As shown in FIG. 14, the parameters of the reflection Bragg grating comprise: an inclination angle α, a period Λ, and a thickness h. The Bragg angle of the reflection Bragg grating is $θ_b$, and the transmission angle of the first diffracted lights in the light guide plate is θ. α, Λ, h, θ and $θ_b$ have the following relationship:

$$\alpha = \frac{\theta}{2}; \theta_b = \frac{\pi}{2} - \frac{\theta}{2} \Lambda = \frac{\lambda}{\sin(\pi/2 - \theta/2)}; |\Delta\theta| = \frac{1.36\lambda}{\pi n_2 \sin\theta_b h}.$$

Where $n_2$ is the refractive index of the light guide plate, λ is the wavelength of the first diffracted lights (equal to the wavelength of the initial lights), and Δθ is the fluctuation range of the incident angle of the first diffracted lights that can be diffracted by the second grating (i.e., the reflection Bragg grating in FIG. 14). It should be noted that Bragg grating can also diffract the incident lights near the Bragg angle (each of the Bragg gratings can diffract the incident lights near the Bragg angle), and the fluctuation range of the incident angle of the incident lights near the Bragg angle is also Δθ. For example, when the incident angle of the first diffracted lights that can be diffracted by the second grating is 57 degrees, if Δθ equals to 1 degree, then the second grating can actually diffract the first diffracted lights with the incident angle of 56.5 degrees to 57.5 degrees.

Figure 15:
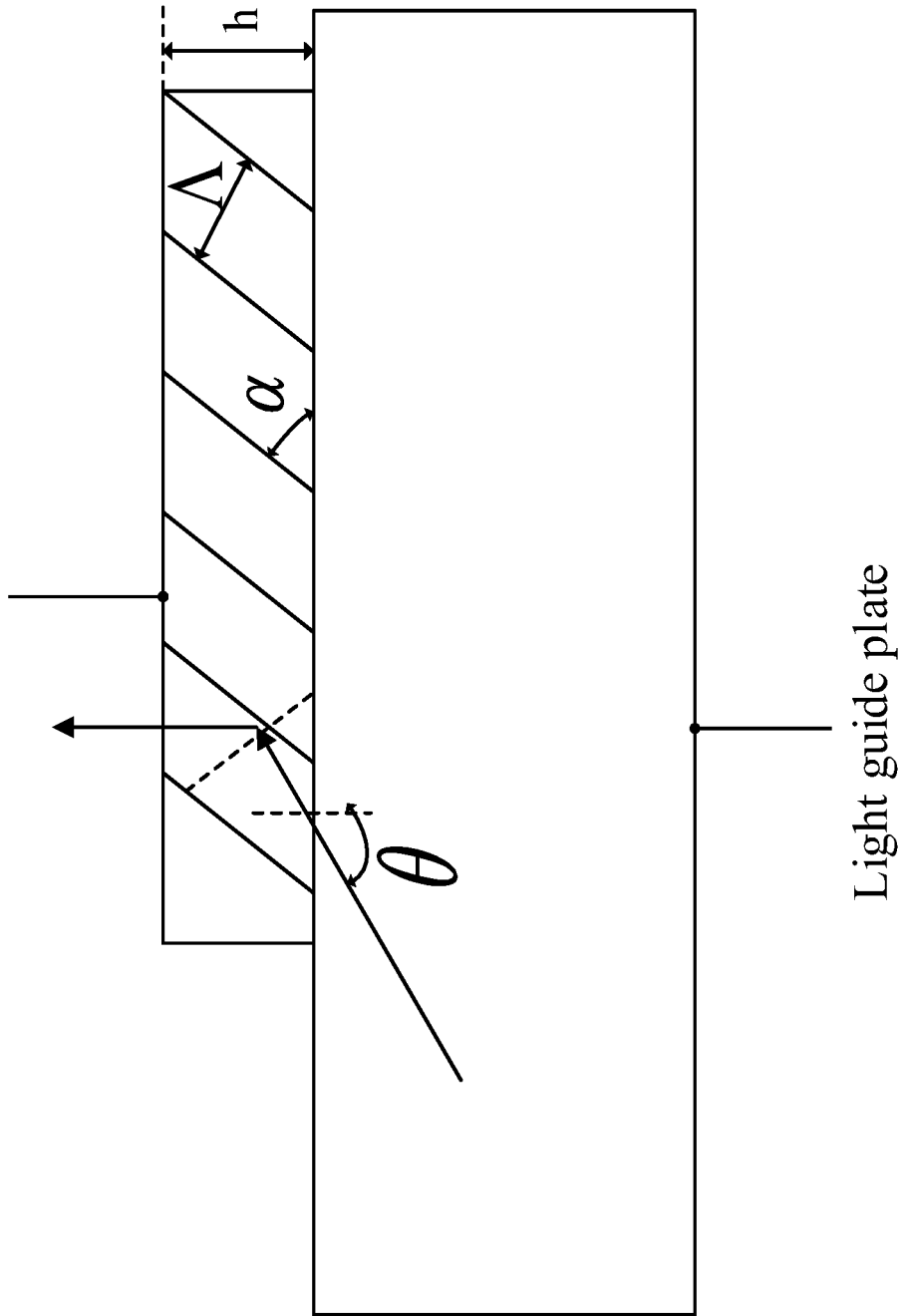
FIG. 15 is a schematic diagram of a structure of transmission Bragg grating according to an embodiment of the present disclosure.

FIG. 15 is a schematic diagram of a structure a transmission Bragg grating according to an embodiment of the present disclosure. As shown in FIG. 15, the parameters of the transmission Bragg grating comprise: an inclination angle α, a period Λ, and a thickness h. The Bragg angle of the transmission Bragg grating is $\theta_b$. The transmission angle of the first diffracted lights in the light guide plate is θ. α, Λ, h, $\theta_b$ and θ have the following relationship:

$$\alpha = \frac{\pi - \theta}{2}; \theta_b = \frac{\theta}{2}; \Lambda = \frac{\lambda}{\sin(\theta/2)}; |\Delta\theta| = \frac{1.36\lambda}{\pi n_2 \sin\theta_b h}.$$

Where n2 is the refractive index of the light guide plate, λ is the wavelength of the first diffracted lights (equal to the wavelength of the initial lights), and Δθ is the fluctuation range of the incident angle of the first diffracted lights that can be diffracted by the second grating (i.e., the transmission Bragg grating in FIG. 15).

When the parameters of the transmission Bragg grating or the reflection Bragg grating are designed, the inclination angle α, the period Λ and the thickness h of the Bragg grating can be calculated according to the transmission angle θ of the first diffracted lights corresponding to the Bragg grating, and the transmission angle of the required second diffracted lights in combination with the relationship of α, Λ, h and θ.

In the backlight module provided by the embodiments of the present disclosure, the parameters of any two first gratings in the first grating group are different, and the parameters of any two second gratings in the second grating group are different. In this way, the first grating group can perform diffraction on the initial lights of different angles, and the second grating group can perform diffraction on the first diffracted lights of different angles. Therefore, the first diffracted lights generated by diffracting of the first grating group are more, the second diffracted lights generated by diffracting of second grating group are more, and the lights emergent from the backlight module are more, thereby improving the utilization ratio of the lights emitted by the light source.

It should be noted that first grating can perform diffraction on the incident lights to generate the diffracted lights having a plurality of diffraction energy levels, and the second grating can perform diffraction on the incident lights to generate the diffracted lights having one diffraction energy level. The diffracted lights having the diffraction energy level of 1 or −1 generally have larger energy. Therefore, in the embodiments of the present disclosure, the parameters of first grating may be set, such that the diffraction energy level of the first diffracted lights generated by the first grating group is 1 or −1; or the first diffracted lights comprise two types of diffracted lights having the diffraction energy levels of 1 and −1 respectively. In the embodiments of the present disclosure, the parameters of first grating may be set, such that the diffraction energy level of the second diffracted lights generated by the second grating group is 1 or −1. In this way, the light energy of the first diffracted lights generated by diffracting of first grating is higher, and the light energy of the second diffracted lights generated by diffracting of the second gratings is also higher, so that the energy of the lights emitted by the backlight module is higher.

The lights finally emitted from the backlight module according to the embodiments of the present disclosure are second diffracted lights, the included angle between the second diffracted lights and the side surface of the light guide plate is less than or equal to 0.5 degree, and the second diffracted lights have a higher collimation degree. Moreover, the backlight module can emit relatively uniform lights under the action of the semi-transparent films. Besides, in the backlight module according to the embodiments of the present disclosure, the thickness of the gratings is smaller. Therefore, the thickness of the entire backlight module is smaller. Optionally, the backlight module can be applied to the field of transparent display of liquid crystal displays as well as the field of Augmented Reality (AR) and Virtual Reality (VR).

In summary, in the backlight module provided in the embodiments of the present disclosure, the light source and the first grating group are oppositely disposed, and the first grating group can emit the first diffracted lights to the second grating group according to the initial lights emitted by the light source, so that the second grating group emits the second diffracted lights to the outside of the backlight module according to the first diffracted lights. When the included angle between the initial lights and the side surface is greater than zero, the included angle between the second diffracted lights and the side surface of the light guide plate is smaller than the included angle between the initial lights and the side surface of the light guide plate. That is, the collimation degree of the second diffracted lights is higher than the collimation degree of the initial lights emitted by the light source, thereby improving the collimation degree of the lights emergent from the backlight module.

An embodiment of the present disclosure provides a display device, and the display device may comprise: a display panel and a backlight module. The display device may be as shown in FIG. 1. The backlight module may be the backlight module shown in any one of FIG. 2 to FIG. 8. The display panel may be a liquid crystal display panel. The display panel may be located on a side of the backlight module where the light emergent surface of the light guide plate is located.

Figure 16:
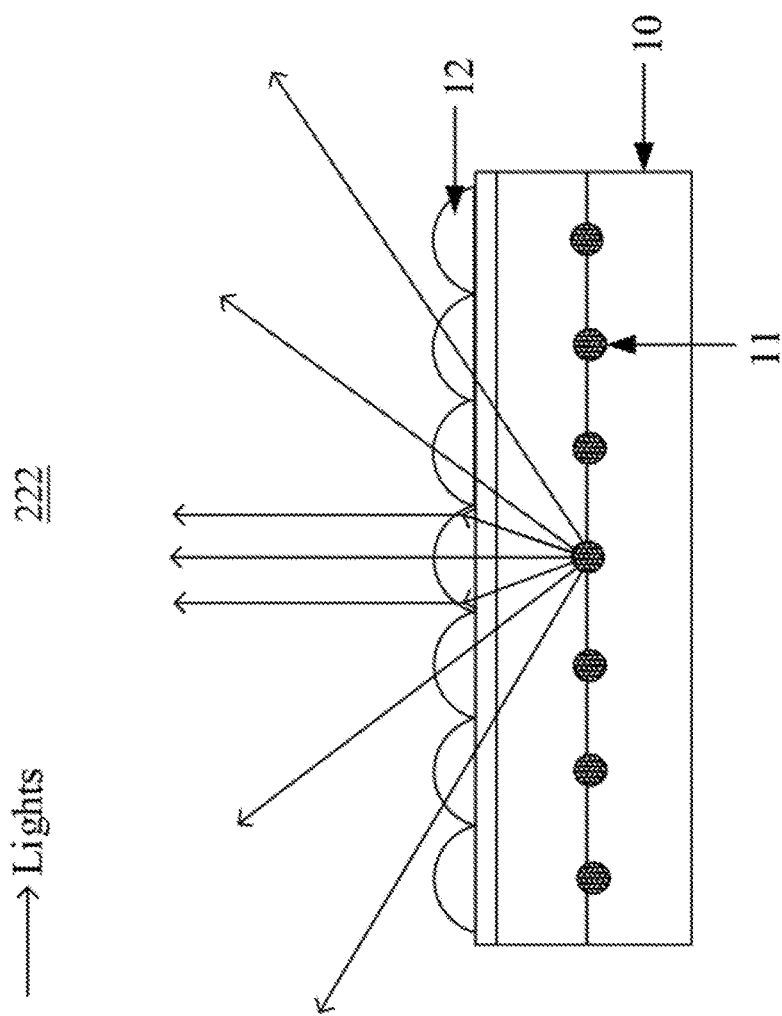
FIG. 16 is a schematic diagram of a structure of a backlight module in the related art.

Further, FIG. 16 is a schematic diagram of a structure of a backlight module provided in the related art. As shown in FIG. 16, the backlight module 222 generally comprises a base substrate 10. A plurality of light sources 11 arranged in an array are disposed on the base substrate 10. A plurality of convex lenses 12 arranged in an array are disposed on the base substrate 10 where the plurality of light sources 11 are disposed. The plurality of light sources 11 and the plurality of convex lenses 12 are in one-to-one correspondence. The focal point of each convex lens 12 is located on the corresponding light source 11. The lights emitted from the area in the light source 11 which coincides with the focal point of the convex lens 12 can become collimated lights under the action of the convex lens 12, and are then incident to the display panel, so that the light emergent side of the display panel emits the collimated lights.

In the related art, there exist the area in the light source which coincides with the focal point of the convex lens, and the area which does not coincide with the focal point of the convex lens, and the convex lens cannot convert the divergent lights emitted from the area in the light source which does not coincide with the focal point into the collimated lights. Therefore, the divergent lights still exist in the lights emergent from the display device, and the collimation rate of the lights emergent from the display device is lower. Moreover, the thickness of the backlight module is larger, and the uniformity of the lights emergent from the backlight module is relatively poor.

In the embodiments of the present disclosure, the initial lights emitted by the light source can sequentially enter the first grating group and the second grating group, and become the collimated second diffracted lights under the action of the first grating group and the second grating group. Therefore, the collimation rate of the second diffracted lights emergent from the backlight module is greater than the collimation rate of the initial lights emergent from the light source, and the collimation rate of the lights emergent from the display device is higher. Besides, under the action of the semi-transparent films, the backlight module can emit relatively uniform lights. In addition, since in the backlight module provided by the embodiments of the present disclosure, the thickness of the gratings is smaller, the thickness of the entire backlight module is smaller.

In summary, in the backlight module provided by the embodiments of the present disclosure, the light source and the first grating group are oppositely disposed, and the first grating group can emit the first diffracted lights to the second grating group according to the initial lights emitted by the light source, so that the second grating group emits the second diffracted lights to the outside of the backlight module according to the first diffracted lights. When the included angle between the initial lights and the side surface is greater than zero, the included angle between the second diffracted lights and the side surface of the light guide plate is smaller than the included angle between the initial lights and the side surface of the light guide plate. That is, the collimation degree of the second diffracted lights is higher than that of the initial lights emitted by the light source, thereby improving the collimation degree of the lights emergent from the backlight module.

The foregoing descriptions are only exemplarily embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A backlight module, comprising: a light source module and a light emergent module, wherein the light source module comprises a transparent block, a light source and a first grating group; the light emergent module comprises: a light guide plate and a second grating group;
    the first grating group is attached to a surface of the transparent block and is opposite to the light source; the light guide plate is provided with a side surface perpendicular to the backlight surface, and a light emergent surface and a backlight surface that are opposite; the light source module is attached to the side surface of the light guide plate; and the second grating group is attached to at least one of the backlight surface and the light emergent surface;
    the light source is configured to emit initial lights to the first grating group; the first grating group is configured to diffract the initial lights into first diffracted lights, and transmit the first diffracted lights in the light guide plate to the second grating group; the second grating group is configured to diffract the first diffracted lights into second diffracted lights, and enable the second diffracted lights to be emergent from the backlight module;
    wherein the second grating group is capable of diffracting first target diffracted lights into second target diffracted lights, the first target diffracted lights being acquired by the first grating group which diffracts target initial lights having an angle with the side surface greater than zero, and an angle between the second target diffracted lights and the side surface being smaller than the angle between the tar et initial lights and the side surface.

2. The backlight module according to claim 1, wherein the transparent block is attached to the side surface of the light guide plate, the surface to which the light source is attached is parallel to the backlight surface, the surface to which the first grating group is attached is parallel to the light emergent surface, and the first grating group includes at least one reflection grating.

3. The backlight module according to claim 1, wherein the first grating group is attached to the side surface of the light guide plate, and the first grating group includes at least one transmission grating.

4. The backlight module according to claim 3, wherein a side of the first grating group away from the transparent block is provided with a flat layer, and the first grating group is attached to the side surface of the light guide plate through the flat layer.

5. The backlight module according to claim 1, wherein propagation directions of the plurality of first diffracted lights generated by the diffracting of the first grating group are parallel to the same plane.

6. The backlight module according to claim 1, wherein parameters of any two gratings in the first grating group are different, and parameters of any two gratings in the second grating group are different.

7. The backlight module according to claim 1, wherein the first diffracted lights comprise at least one of diffracted lights with a diffraction energy level of 1 and diffracted lights with a diffraction energy level of 1; and
    the second diffracted lights comprise one of diffracted lights with a diffraction energy level of 1 and diffracted lights with a diffraction energy level of 1.

8. The backlight module according to claim 1, wherein the first grating group comprises a plurality of first gratings, the second grating group comprises a plurality of second gratings, and the second gratings are Bragg gratings,
    a plurality of angles are formed between the plurality of first diffracted lights generated by the diffracting of the first grating group and the side surface, and angle values of the plurality of angles belong to a set of angle values of Bragg angles of the plurality of second gratings.

9. The backlight module according to claim 8, wherein the second grating is attached to one of the backlight surface and the light emergent surface, and
    when the second grating is attached to the backlight surface, the second gratings is a reflection Bragg grating;
    when the second grating is attached to the light emergent surface, the second grating is a transmission Bragg grating.

10. The backlight module according to claim 8, wherein a part of the second gratings are attached to the backlight surface, and the other part of the second gratings are attached to the light emergent surface;
    the second gratings attached to the backlight surface are reflection Bragg gratings, the second gratings attached to the light emergent surface are transmission Bragg gratings, and orthogonal projection areas of any two second gratings in the second grating group on the light emergent surface do not overlap.

11. The backlight module according to claim 10, wherein the second gratings attached to the backlight surface and the second gratings attached to the light emergent surface are at an interval one by one.

12. The backlight module according to claim 8, wherein a length of each of the second gratings is equal to a total length of the first grating group.

13. The backlight module according to claim 8, wherein the second grating group diffracts first auxiliary diffracted lights into second auxiliary diffracted lights, the first auxiliary diffracted lights being acquired by the first grating group which diffracts the initial lights having an angle with side surface equal to zero, and an angle between the second target diffracted lights and the side surface is equal to zero.

14. The backlight module according to claim 8, wherein a structure of the backlight module satisfies one of the following:
the transparent block is attached to the side surface of the light guide plate, the surface to which the light source is attached is parallel to the backlight surface, the surface to which the first grating group is attached is parallel to the light emergent surface, and the first grating group includes at least one reflection grating the second grating group comprises a plurality of second gratings, the second grating is attached to the backlight surface, and the second grating is a reflection Bragg grating, wherein the backlight module further comprises: a semi-transparent film group, the semi-transparent film group is on a side of the light emergent surface of the light guide plate, and is configured to control the second diffracted lights from the second grating group to be incident to the semi-transparent film group; the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights, a side of the first grating group away from the transparent block is provided with a flat layer, and on a side of the light emergent surface of the light guide plate, an area in the backlight module other than an area where the backlight module is provided;
the transparent block is attached to the side surface of the light guide plate, the surface to which the light source is attached is parallel to the backlight surface, the surface to which the first grating group is attached is parallel to the light emergent surface, and the first grating group includes at least one reflection grating, the second grating group comprises a plurality of second gratings, the second grating is attached to the light emergent surface, and the second grating is a transmission Bragg grating: wherein the backlight module further comprises: a semi-transparent film group, the semi-transparent film group is on a side of the light emergent surface of the light guide plate, and is configured to control the second diffracted lights from the second grating group to be incident to the semi-transparent film group: the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights, a side of the first grating group away from the transparent block is provided with a flat layer, and on a side of the light emergent surface of the light guide plate, an area in the backlight module other than an area where the backlight module is provided;
the transparent block is attached to the side surface of the light guide plate, the surface to which the light source is attached is parallel to the backlight surface, the surface to which the first grating group is attached is parallel to the light emergent surface and the first grating group includes at least one reflection grating, the second grating group comprises a plurality of second gratings; a part of the second gratings are attached to the backlight surface, and the other part of the second gratings are attached to the light emergent surface; the second gratings attached to the backlight surface are reflection Bragg gratings, the second gratings attached to the light emergent surface are transmission Bragg gratings, and orthogonal projection areas of any two second gratings in the second grating group on the light emergent surface do not overlap; wherein the backlight module further comprises: a semi-transparent film group, the semi-transparent film group is on a side of the light emergent surface of the light guide late and is configured to control the second diffracted lights from the second grating group to be incident to the semi-transparent film group; the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights, a side of the first grating group away from the transparent block is provided with a flat layer, and on a side of the light emergent surface of the light guide plate, an area in the backlight module other than an area where the backlight module is provided;
the first grating group is attached to the side surface of the light guide plate, and the first grating group includes at least one transmission grating, the second grating group comprises a plurality of second gratings, the second grating is attached to the backlight surface, and the second grating is a reflection Bragg grating; configured to control the second diffracted lights from the second grating group to be incident to the semi-transparent film group; the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights; a side of the first grating group away from the transparent block is provided with a flat layer; and on a side of the light emergent surface of the light guide plate, an area in the backlight module other than an area where the backlight module is provided is wrapped by a light absorbing layer;
the first grating group is attached to the side surface of the light guide plate, and the first grating group includes at least one transmission grating, the second grating group comprises a plurality of second gratings, the second gratings is attached to the backlight surface, and each of the second gratings is a reflection Bragg grating; configured to control the second diffracted lights from the second grating group to be incident to the semi-transparent film group; the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights; a side of the first grating group away from the transparent block is provided with a flat layer; and on a side of the light emergent surface of the light guide late an area in the backlight module other than an area where the backlight module is provided is wrapped by a light absorbing layer; and the first grating group is attached to the side surface of the light guide plate, and the first grating group includes at least one transmission grating; the second grating group comprises a plurality of second gratings, a part of the second gratings are attached to the backlight surface, and the other part of the second gratings are attached to the light emergent surface; the second gratings attached to the backlight surface are reflection Bragg gratings, the second gratings attached to the light emergent surface are transmission Bragg gratings, and orthogonal projection areas of any two second gratings in the second gratin group on the light emergent surface do not overlap; the backlight module further comprises: a semi-transparent film group, the semi-transparent film group is on a side of the light emergent surface of the light guide plate, and is configured to control the second diffracted lights from the second grating group to be incident to the semi-transparent film group; the semi-transparent film in the semi-transparent film group is obliquely disposed on the light emergent surface; and semi-transparent film is configured to reflect a part of the incident second diffracted lights to other semi-transparent films, and transmit the other part of the incident second diffracted lights; a side of the first grating group away from the transparent block is provided with a flat layer; on a side of the light emergent surface of the light guide plate, an area in the backlight module other than an area where the backlight module is provided is wrapped by a light absorbing laver.

15. The backlight module according to claim 1, wherein the backlight module further comprises: a semi-transparent film group, the semi-transparent film group is on a side of the light emergent surface of the light guide plate, and is configured to control the second diffracted lights from the second grating group to be incident to the semi-transparent film group;

the semi-transparent film in the semi-transparent film is obliquely disposed on the light emergent surface; and semi-transparent film is configured to reflect a part of the incident second diffracted lights to other semi-transparent films, and transmit the other part of the incident second diffracted lights.

16. The backlight module according to claim 15, wherein the plurality of semi-transparent films comprise first semi-transparent films and second semi-transparent films, the second diffracted lights incident to the first semi-transparent films are more than the second diffracted lights incident to the second semi-transparent films, and a light transmittance of the first semi-transparent films is smaller than a light transmittance of the second semi-transparent films.

17. The backlight module according to claim 15, wherein the plurality of semi-transparent films are arranged in array, and the plurality of semi-transparent films have same shape and same area.

18. The backlight module according to claim 1, wherein the backlight module comprises: at least one light source module and at least one light emergent module, and the at least one light source module and the at least one light emergent module are an interval one by one.

19. The backlight module according to claim 1, wherein on a side of the light emergent surface of the light guide plate, an area in the backlight module other than an area where the backlight module is provided is wrapped by a light absorbing layer.

20. A display device, comprising a display panel and a backlight module which comprises: a light source module and a light emergent module, wherein the light source module comprises a transparent block, a light source and a first grating group; the light emergent module comprises: a light guide plate and a second grating group;

the first grating group is attached to a surface of the transparent block and disposed opposite to the light source; the light guide plate is provided with a side surface Perpendicular to the backlight surface, and a light emergent surface and a backlight surface that are oppositely; the display panel is on the light emergent surface of the light guide plate, the light source module is attached to the side surface of the light guide plate; and the second grating group is attached to at least one of the backlight surface and the light emergent surface;

the light source is configured to emit initial lights to the first grating group; the first grating group is configured to diffract the initial lights into first diffracted lights, and transmit the first diffracted lights in the light guide plate to the second grating group; the second grating group is configured to diffract the first diffracted lights into second diffracted lights, and enable the second diffracted lights to be emergent from the backlight module wherein the second grating group is capable of diffracting first target diffracted lights to be second target diffracted lights, the first target diffracted lights being acquired b the first grating group through diffracting the initial lights having an angle with side surface greater than zero, and an angle between the second target diffracted lights and the side surface being smaller than the angle between the initial lights and the side surface.

* * * * *